US010508165B2

(12) United States Patent
Park et al.

(10) Patent No.: US 10,508,165 B2
(45) Date of Patent: Dec. 17, 2019

(54) OLEFIN-BASED POLYMER

(71) Applicant: LG Chem, Ltd., Seoul (KR)

(72) Inventors: Sang Eun Park, Daejeon (KR); Hae Woong Park, Daejeon (KR); Choong Hoon Lee, Daejeon (KR); Seung Hwan Jung, Daejeon (KR); Ji Yoon Woo, Daejeon (KR); Hyo Ju Kim, Daejeon (KR); Young Woo Lee, Daejeon (KR)

(73) Assignee: LG Chem, Ltd. (KR)

(*) Notice: Subject to any disclaimer, the term of this patent is extended or adjusted under 35 U.S.C. 154(b) by 18 days.

(21) Appl. No.: 15/743,469

(22) PCT Filed: Dec. 8, 2016

(86) PCT No.: PCT/KR2016/014369
§ 371 (c)(1),
(2) Date: Jan. 22, 2018

(87) PCT Pub. No.: WO2017/099491
PCT Pub. Date: Jun. 15, 2017

(65) Prior Publication Data
US 2018/0201706 A1    Jul. 19, 2018

(30) Foreign Application Priority Data

Dec. 8, 2015  (KR) .................. 10-2015-0174229

(51) Int. Cl.
*C08F 210/16* (2006.01)
*C08F 2/04* (2006.01)
(Continued)

(52) U.S. Cl.
CPC .............. *C08F 210/16* (2013.01); *C08F 2/04* (2013.01); *C08F 4/42* (2013.01); *C08F 210/02* (2013.01);
(Continued)

(58) Field of Classification Search
USPC ..................... 526/281, 308, 348.2
See application file for complete search history.

(56) References Cited

U.S. PATENT DOCUMENTS 5,064,802 A   11/1991  Stevens et al.
5,539,076 A    7/1996  Nowlin et al.
(Continued)

FOREIGN PATENT DOCUMENTS

EP    2982677 A1    2/2016
EP    3318601 A1    5/2018
(Continued)

OTHER PUBLICATIONS

Extended European Search Report for EP Application No. 16873356.6, dated Aug. 13, 2018.
(Continued)

*Primary Examiner* — Fred M Teskin
(74) *Attorney, Agent, or Firm* — Lerner, David, Littenberg, Krumholz & Mentlik, LLP

(57) ABSTRACT

The present invention provides an olefin-based polymer which satisfies the following conditions of (1) to (4) and is capable of exhibiting improved impact strength without degrading mechanical properties such as tensile strength: (1) density (d): from 0.850 to 0.910 g/cc, (2) melting index (MI, 190° C., 2.16 kg load conditions): from 0.1 to 100 g/10 min, (3) molecular weight distribution (MWD): from 1.5 to 3.0, and (4) two peaks are shown in a temperature range of −20° C. to 120° C. when taking measurements of temperature rising elution fractionation (TREF), and a relation of T(90)−T(50)≥60° C. is satisfied (where T(90) is a temperature at which 90 wt % of the olefin-based polymer is eluted, and T(50) is a temperature at which 50 wt % of the olefin-based polymer is eluted).

13 Claims, 12 Drawing Sheets

(51) Int. Cl.
- *C08F 4/42* (2006.01)
- *C08F 210/02* (2006.01)
- *C08F 210/06* (2006.01)
- *C08F 210/08* (2006.01)
- *C08F 210/14* (2006.01)
- *C08F 212/08* (2006.01)
- *C08F 212/36* (2006.01)
- *C08F 236/06* (2006.01)
- *C08F 236/04* (2006.01)

(52) U.S. Cl.
CPC .......... *C08F 210/06* (2013.01); *C08F 210/08* (2013.01); *C08F 210/14* (2013.01); *C08F 212/08* (2013.01); *C08F 212/36* (2013.01); *C08F 236/045* (2013.01); *C08F 236/06* (2013.01); *C08F 2500/01* (2013.01); *C08F 2500/04* (2013.01); *C08F 2500/08* (2013.01); *C08F 2800/20* (2013.01)

(56) References Cited

U.S. PATENT DOCUMENTS

| | | |
|---|---|---|
| 2008/0021183 A1 | 1/2008 | Graham et al. |
| 2012/0101242 A1 | 4/2012 | Crowther et al. |
| 2013/0345377 A1 | 12/2013 | Ker et al. |
| 2015/0094435 A1 | 4/2015 | Cho et al. |

FOREIGN PATENT DOCUMENTS

| | | |
|---|---|---|
| KR | 2007-0120498 A | 12/2007 |
| KR | 20090031592 A | 3/2009 |
| KR | 2013-0113470 A | 10/2013 |
| KR | 2015-0034655 A | 4/2015 |
| KR | 2015-0096665 A | 8/2015 |

OTHER PUBLICATIONS

International Search Report From PCT/KR2016/014369 dated Mar. 17, 2017.

OLEFIN-BASED POLYMER

CROSS-REFERENCE TO RELATED APPLICATIONS

This application is a national phase entry under 35 U.S.C. § 371 of International Application No. PCT/KR2016/014369, filed Dec. 8, 2016, which claims priority to Korean Patent Application No. 10-2015-0174229, filed Dec. 8, 2015, the disclosures of which are incorporated herein by reference.

TECHNICAL FIELD

The present invention relates to an olefin-based polymer, and more particularly, to an olefin-based polymer which is capable of exhibiting improved impact strength without degrading mechanical properties such as tensile strength by controlling crystallinity.

BACKGROUND ART

[Me2Si(Me$_4$CF)NtBu]TiCl$_2$ (Constrained-Geometry Catalyst, hereinafter, will be abbreviated as CGC) was reported by Dow Co. in the early 1990s (U.S. Pat. No. 5,064,802), and excellent aspects of the CGC in the copolymerization reaction of ethylene and alpha-olefin may be summarized in the following two points when compared to commonly known metallocene catalysts.

(1) At a high polymerization temperature, high activity is shown and a polymer having high molecular weight is produced, and (2) the copolymerization degree of alpha-olefin having large steric hindrance such as 1-hexene and 1-octene is excellent.

Meanwhile, a copolymer prepared by using the CGC catalyst includes a small amount of a low molecular weight part and may have improved physical properties such as strength when compared to a copolymer prepared by using a common Ziegler-Natta catalyst.

However, despite the above-described merits, the copolymer prepared by using the CGC catalyst has the defects of deteriorating processability when compared to the polymer prepared by using the common Ziegler-Natta catalyst.

U.S. Pat. No. 5,539,076 discloses a metallocene/non-metallocene blend catalyst system for preparing a specific bimodal copolymer having high density. The catalyst system is supported by an inorganic carrier. A supported Ziegler-Natta catalyst and a metallocene catalyst system have a drawback such that a supported hybrid catalyst has lower activity than a homogeneous single catalyst, and the preparation of an olefin-based polymer having appropriate properties according to the purpose is difficult. In addition, since the olefin-based polymer is prepared in a single reactor, it is apprehended that gel that is generated during a blending process may be produced, the insertion of a comonomer in a high molecular weight part may be difficult, the shape of a produced polymer may become poor, two polymer components may be mixed nonhomogeneously, and the control of quality may become difficult.

Thus, the development of an olefin-based polymer that may overcome the drawbacks of a common olefin-based polymer and provide improved physical properties is still required.

DISCLOSURE OF THE INVENTION

Technical Problem

An aspect of the present invention is to provide an olefin-based polymer which is capable of exhibiting improved impact strength without degrading mechanical properties such as tensile strength by controlling crystallinity.

Technical Solution

According to an embodiment of the present invention, there is provided an olefin-based polymer satisfying the following conditions of (1) to (4):

(1) density (d): from 0.850 to 0.910 g/cc, (2) melting index (MI, 190° C., 2.16 kg load conditions): from 0.1 to 100 g/10 min, (3) molecular weight distribution (MWD): from 1.5 to 3.0, and (4) two peaks are shown in a temperature range of −20° C. to 120° C. when taking measurements of temperature rising elution fractionation (TREF), and a relation of T(90)−T(50)≥60° C. is satisfied (where T(90) is a temperature at which 90 wt % of the olefin-based polymer is eluted, and T(50) is a temperature at which 50 wt % of the olefin-based polymer is eluted).

Advantageous Effects

The olefin-based polymer according to the present invention may exhibit improved impact strength without degrading mechanical properties such as tensile strength by controlling crystallinity. As a result, the olefin-based polymer may be used in diverse fields and uses including wrapping, construction, daily supplies, or the like, in addition to as a material for an automobile, a wire, a toy, a fiber, a medicine, or the like. Particularly, the olefin-polymer may be used for an automobile which requires high impact strength.

BRIEF DESCRIPTION OF THE DRAWINGS

The accompanying drawings in the present disclosure illustrate preferred embodiments of the present invention and are included together with the above description to provide a further understanding of the inventive concept. The inventive concept, however, should not be construed as limited to the accompanying drawings.

BEST MODE FOR CARRYING OUT THE INVENTION

Figure 1:
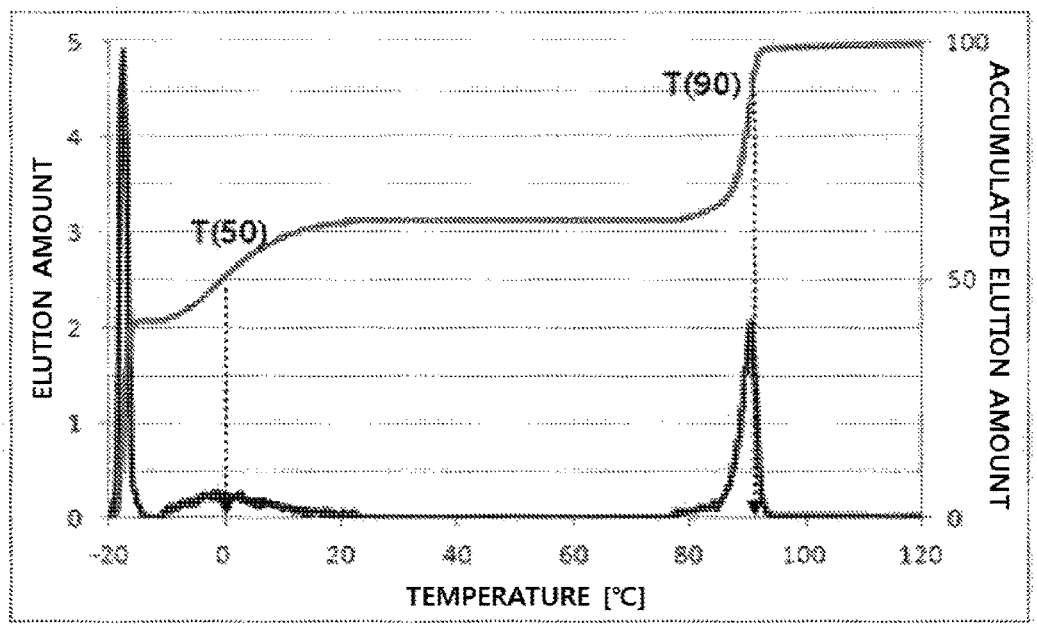
FIG. 1 illustrates a temperature rising elution fractionation (TREF) graph of an olefin-based polymer prepared in Example 1.

Hereinafter, the present invention will be described in more detail to assist the understanding of the present invention.

It will be understood that terms or words used in the specification and claims, should not be interpreted as having a meaning that is defined in dictionaries, but should be interpreted as having a meaning that is consistent with their meaning in the context of the present invention on the basis of the principle that the concept of the terms may be appropriately defined by the inventors for the best explanation of the invention.

In the present disclosure, the term "polymer" denotes a polymer compound prepared by the polymerization of monomers which have the same or different types. The general term of the "polymer" includes "hybrid polymer" as well as "homopolymer," "copolymer" and "tercopolymer". In addition, the "hybrid polymer" denotes a polymer prepared by the polymerization of at least two different types of monomers. The general term of the "hybrid polymer" denotes the "copolymer" (which is commonly used for denoting a polymer prepared using two different types of monomers) and the "tercopolymer" (which is commonly used for denoting a polymer prepared using three different types of monomers). The "hybrid polymer" includes a polymer prepared by the polymerization of at least four different types of monomers.

In a case where an olefin-based polymer is compounded with another polymer such as a polypropylene resin, different physical properties are attained according to the crystallinity of the olefin-based polymer. In a case where a low crystalline olefin-based polymer having a peak at a low temperature when taking measurements of TREF, is compounded with another polymer such as a polypropylene resin, high impact strength may be attained, but mechanical properties are degraded. Meanwhile, a high crystalline polymer having a peak at a high temperature when taking measurements of TREF attains degraded impact strength but increased mechanical properties.

Accordingly, by using a catalyst composition including different kinds of transition metal compounds which have excellent miscibility and by controlling the amount of a comonomer and preparation conditions at the same time during preparing an olefin-based polymer, different kinds of crystal structures having a large crystallinity difference in a polymer are formed, and thus, an olefin-based polymer having excellent impact strength without degrading mechanical properties such as tensile strength may be provided in the present invention.

That is, the olefin-based polymer according to an embodiment of the present invention satisfies the following conditions of (1) to (4):

(1) density (d): from 0.850 to 0.910 g/cc, (2) melting index (MI, 190° C., 2.16 kg load conditions): from 0.1 to 100 g/10 min, (3) molecular weight distribution (MWD): from 1.5 to 3.0, and (4) two peaks are shown in a temperature range of −20° C. to 120° C. when taking measurements of temperature rising elution fractionation (TREF), and a relation of T(90)−T(50)≥60° C. is satisfied (where T(90) is a temperature at which 90 wt % of the olefin-based polymer is eluted, T(50) is a temperature at which 50 wt % of the olefin-based polymer is eluted, the yield of a polymer may be calculated as the integral value of a temperature-elution amount graph in TREF).

Particularly, the olefin-based polymer according to an embodiment of the present invention shows a low density of 0.850 to 0.910 g/cc when taking measurements according to ASTM D-792.

Generally, the density of an olefin-based polymer is influenced by the kinds and amounts of monomers used for polymerization, a polymerization degree, or the like, and in case of a copolymer, influence by the amount of a comonomer is significant. In the present invention, a large amount of comonomers may be introduced due to the use of a metallocene-based catalyst composition including different kinds of transition metal compounds having distinguishing structures. As a result, the olefin-based polymer according to an embodiment of the present invention has a low density in the above-described range, and as a result, may exhibit excellent impact strength. More particularly, the olefin-based polymer may have a density of 0.860 to 0.890 g/cc, and in this case, the maintenance of mechanical properties and the improving effect of impact strength according to the control of density are even more remarkable.

In addition, the mechanical properties and impact strength of an olefin-based polymer, and melting index (MI) which influences moldability may be controlled by adjusting the amount used of a catalyst during a polymerization process. The olefin-based polymer according to an embodiment of the present invention may show melting index (MI) of particularly 0.1 to 100 g/10 min, more particularly, 0.1 to 50 g/10 min when taking measurements according to ASTM D1238 at 190° C. under load conditions of 2.16 kg in the above-described low density conditions, and may show excellent impact strength without degrading mechanical properties.

In addition, if at least two kinds of polymers are mixed, molecular weight distribution (MWD) is generally increased, and as a result, impact strength and mechanical properties are decreased, and blocking phenomenon, or the like arises. The olefin-based polymer according to an embodiment of the present invention uses a metallocene-based catalyst composition including different kinds of transition metal compounds having distinguishing structures, and a single peak, that is, a monomodal-type peak is shown in a molecular weight distribution curve when taking measurements of GPC even though at least two kinds of polymers are mixed. In addition, the olefin-based polymer according to an embodiment of the present invention shows narrow molecular weight distribution, and as a result, may show excellent impact strength. Particularly, the olefin-based polymer may have molecular weight distribution (MWD) of 1.5 to 3.0, more particularly, 1.5 to 2.8, which is the ratio (Mw/Mn) of a weight average molecular weight (Mw) and a number average molecular weight (Mn).

In addition, the olefin-based polymer may have a weight average molecular weight (Mw) of 10,000 to 500,000 g/mol, more particularly, 20,000 to 200,000 g/mol, further more particularly, 50,000 to 100,000 g/mol in the molecular weight distribution range.

In the present invention, the weight average molecular weight (Mw) and the number average molecular weight (Mn) are a polystyrene conversion molecular weight which is analyzed by gel permeation chromatography (GPC).

The physical properties of an olefin-based polymer which is polymerized using a common metallocene catalyst are determined during compounding according to the crystallinity thereof, and generally, the olefin-based polymer has single crystallinity showing one peak in a temperature range of −20° C. to 120° C. when taking measurements of TREF, and T(90)−T(50) of 10° C. to 30° C. In contrast, the olefin-based polymer according to an embodiment of the present invention includes different kinds of crystal structures which have a large crystallinity difference, and may show improved impact strength and improved mechanical properties at the same time during compounding.

Particularly, the olefin-based polymer according to an embodiment of the present invention may have two peaks in a temperature range of −20° C. to 120° C. when taking measurements of temperature rising elution fractionation (TREF), and T(90)−T(50) of 60° C. or more, particularly, 70° C. or more, more particularly, from 70° C. to 110° C., further more particularly, from 80° C. to 110° C., which is the difference between T(50) which is an elution temperature at which 50 wt % of the olefin-based polymer is eluted and T(90) which is an elution temperature at which 90 wt % of the olefin-based polymer is eluted.

Generally, if two or more kinds of olefin-based polymers with different density and crystallinity are respectively prepared in separate reactors, and then blended, two peaks may be shown when taking measurements of TREF of the composition thus mixed or the olefin block copolymer thereof. On the other hand, in the present invention, crystallinity distribution is controlled widely by a continuous solution polymerization in a single reactor, and two peaks are shown when taking measurements of TREF in a state where a block is not formed in a polymer, and T(90)−T(50) is 60° C. or more, particularly, 70° C. or more, more particularly, from 70° C. to 110° C., further more particularly, from 80° C. to 110° C., resulting a very large difference.

In addition, two peaks may be shown on TREF not in an olefin-based polymer but in a linear low-density ethylene-based polymer to which a Ziegler-Natta catalyst system is applied, but a relation of T(90)−T(50)<50° C. is attained, resulting a small difference.

In addition, the olefin-based polymer according to an embodiment of the present invention may have T(90) of 70° C. or more, particularly, 80° C. or more, more particularly, 85° C. to 120° C. when taking measurements of TREF due to a crystal structure with high crystallinity, which serves mechanical strength. Meanwhile, in an olefin-based polymer which is polymerized using a common metallocene catalyst, T(90) is shown in a measurement range of −20° C. to 120° C. according to the density and crystallinity thereof, and is difficult to delimit.

In the present invention, TREF may be measured by using a TREF machine of PolymerChar Co. and particularly, may be measured while elevating the temperature from −20° C. to 120° C. using o-dichlorobenzene as a solvent.

In addition, in the present invention, T(50) means the temperature at a point where the elution of 50 wt % of the total elution amount is terminated in a TREF elution graph expressed by an elution amount with respect to temperature (dC/dT), and T(90) means the temperature at a point where the elution of 90 wt % of the total elution amount is terminated in a TREF elution graph expressed by an elution amount with respect to temperature (dC/dT). In addition, for calculating T(90) and T(50), the initiation point of each peak in the graph of elution amount with respect to temperature (dC/dT) may be defined as a point where the elution of a polymer is initiated based on a base line, and the end point of each peak may be defined as a point where the elution of a polymer is terminated based on a base line. In addition, a peak expressed in −20° C. to −10° C. may be regarded as a portion of a peak expressed in after −10° C., which is shown in this position due to the limitation of measurement. Accordingly, the peak expressed in this position may be included and treated as a peak expressed in after −10° C.

In addition, the olefin-based polymer according to an embodiment of the present invention may have an accumulated elution amount via purging of less than −20° C., or in a temperature range of −20° C. to 10° C. when taking measurements of temperature rising elution fractionation, of 20 to 80 wt %, more particularly, 30 to 80 wt %, further more particularly, 50 to 70 wt % based on the total amount of a polymer.

The olefin-based polymer may particularly be a homopolymer of olefin-based monomers, for example, any one selected from the group consisting of an alpha-olefin-based monomer, a cyclic olefin-based monomer, a diene olefin-based monomer, a triene olefin-based monomer and a styrene-based monomer, or a copolymer of at least two thereof. More particularly, the olefin-based polymer may be a copolymer of ethylene with alpha-olefin of 3 to 12 carbon atoms or 3 to 8 carbon atoms, and further more particularly, may be a copolymer of ethylene with propylene, ethylene with 1-butene, ethylene with 1-hexene, ethylene with 4-methyl-1-pentene, or ethylene with 1-octene. In addition, if the olefin-based polymer is the copolymer of ethylene with alpha-olefin, the amount of the alpha-olefin may be 90 wt % or less, more particularly, 70 wt % or less, further more particularly, 5 to 50 wt % based on the total amount of the copolymer. Within the range, the above-described physical properties may be easily accomplished, excellent miscibility with polypropylene may be shown, and as a result, even more improved impact strength effects may be exhibited.

The olefin-based polymer according to an embodiment of the present invention, which has the above-described physical properties and constitutional characteristics may be prepared by a continuous solution polymerization reaction in the presence of a metallocene catalyst composition including at least one kind of a transition metal compound in a single reactor. Accordingly, in the olefin-based polymer according to an embodiment of the present invention, a block formed by linearly connecting two or more repeating units derived from one monomer among monomers constituting a polymer in the polymer is not formed. That is, the olefin-based polymer according to the present invention does not include a block copolymer, but may be selected from the group consisting of a random copolymer, an alternating copolymer and a graft copolymer, more particularly, may be a random copolymer.

Particularly, the olefin-based polymer may be prepared by a preparation method including a step of polymerizing an olefin-based monomer using a catalyst composition including a first transition metal compound of Formula 1 and a second transition metal compound of Formula 2 in a weight ratio of 50:50 to 80:20. Accordingly, in another embodiment of the present invention, a preparation method of the olefin-based polymer is provided. However, in the preparation of an olefin-based polymer according to an embodiment of the present invention, the structure ranges of the first transition metal compound and the second transition metal compound are not limited to specifically disclosed types, but all modifications, equivalents, or replacements included in the scope and technical range of the present invention should be understood to be included in the present invention.

[Formula 1]

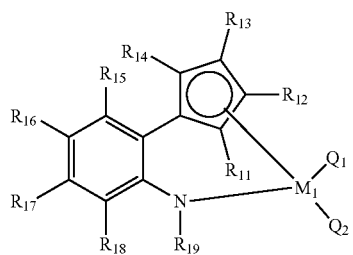

[Formula 2]

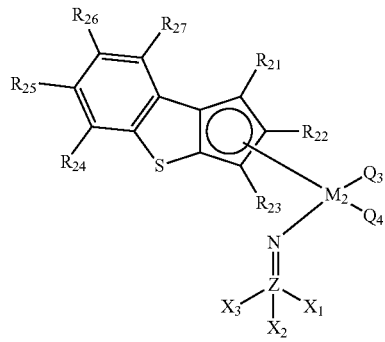

In Formulae 1 and 2, $M_1$ and $M_2$ are each independently a transition metal in group 4, $Q_1$, $Q_2$, $Q_3$, and $Q_4$ are each independently selected from the group consisting of a hydrogen atom, a halogen group, an alkyl group of 1 to 20 carbon atoms, an alkenyl group of 2 to 20 carbon atoms, a cycloalkyl group of 3 to 20 carbon atoms, an aryl group of 6 to 20 carbon atoms, an alkylaryl group of 6 to 20 carbon atoms, an arylalkyl group of 7 to 20 carbon atoms, an alkylamino group of 1 to 20 carbon atoms, an arylamino group of 6 to 20 carbon atoms, and an alkylidene group of 1 to 20 carbon atoms, $R_{11}$ to $R_{14}$ are each independently selected from the group consisting of a hydrogen atom, a halogen group, a silyl group, an alkyl group of 1 to 20 carbon atoms, an alkenyl group of 2 to 20 carbon atoms, a cycloalkyl group of 3 to 20 carbon atoms, an aryl group of 6 to 20 carbon atoms, an alkylaryl group of 7 to 20 carbon atoms, an arylalkyl group of 7 to 20 carbon atoms, and a metalloid radical of a metal in group 14 substituted with a hydrocarbyl group of 1 to 20 carbon atoms; or at least two adjacent functional groups of $R_{11}$ to $R_{14}$ are connected to each other to form an aliphatic ring of 5 to 20 carbon atoms or an aromatic ring group of 6 to 20 carbon atoms, which is unsubstituted or substituted with at least one substituent selected from the group consisting of a halogen group, an alkyl group of 1 to 20 carbon atoms, an alkenyl group of 2 to 20 carbon atoms, and an aryl group of 6 to 20 carbon atoms, $R_{15}$ to $R_{19}$ are each independently selected from the group consisting of a hydrogen atom, a halogen group, a silyl group, an alkyl group of 1 to 20 carbon atoms, an alkenyl group of 2 to 20 carbon atoms, a cycloalkyl group of 3 to 20 carbon atoms, an aryl group of 6 to 20 carbon atoms, an alkylaryl group of 7 to 20 carbon atoms, and an arylalkyl group of 7 to 20 carbon atoms, or at least two adjacent functional groups of $R_{15}$ to $R_{19}$ are connected to each other to form an aliphatic ring of 5 to 20 carbon atoms or an aromatic ring of 6 to 20 carbon atoms, which is unsubstituted or substituted with at least one substituent selected from the group consisting of a halogen group, an alkyl group of 1 to 20 carbon atoms, an alkenyl group of 2 to 20 carbon atoms, and an aryl group of 6 to 20 carbon atoms, $R_{21}$ to $R_{27}$ are each independently selected from the group consisting of a hydrogen atom, a halogen group, a hydrocarbyl group of 1 to 20 carbon atoms, a hetero hydrocarbyl group of 1 to 20 carbon atoms, and a metalloid radical of a metal in group 14 substituted with a hydrocarbyl group of 1 to carbon atoms, and particularly, $R_{21}$ to $R_{27}$ are each independently selected from the group consisting of a hydrogen atom, a halogen group, a silyl group, an alkyl group of 1 to 20 carbon atoms, an alkenyl group of 2 to 20 carbon atoms, a cycloalkyl group of 3 to 20 carbon atoms, an aryl group of 6 to 20 carbon atoms, an alkylaryl group of 7 to 20 carbon atoms, an arylalkyl group of 7 to 20 carbon atoms, and a metalloid radical of a metal in group 14 substituted with a hydrocarbyl group of 1 to 20 carbon atoms;

$X_1$ to $X_3$ are each independently selected from the group consisting of a hydrogen atom, a halogen group, a hydrocarbyl group of 1 to 20 carbon atoms, and a hetero hydrocarbyl group of 1 to 20 carbon atoms, and more particularly are each independently selected from the group consisting of a hydrogen atom, a halogen group, a silyl group, an amino group, an (alkyl of 1 to 20 carbon atoms)amino group, an alkyl group of 1 to 20 carbon atoms, an alkenyl group of 2 to 20 carbon atoms, a cycloalkyl group of 3 to 20 carbon atoms, an aryl group of 6 to 20 carbon atoms, an alkylaryl group of 7 to 20 carbon atoms, and an arylalkyl group of 7 to 20 carbon atoms; or at least two adjacent functional groups of $X_1$ to $X_3$ are connected to each other to form an aliphatic ring of 5 to 20 carbon atoms or an aromatic ring of 6 to 20 carbon atoms, which is substituted with at least one substituent selected from the group consisting of a halogen group, a silyl group, an amino group, an (alkyl of 1 to 20 carbon atoms)amino group, an alkyl group of 1 to 20 carbon atoms, an alkenyl group of 2 to 20 carbon atoms, and an aryl group of 6 to 20 carbon atoms, and Z is phosphor (P), arsenic (As), or antimony (Sb).

In the transition metal compound of Formula 1, a metal site is connected to a cyclopentadienyl ligand introducing an amino group which is connected to a phenylene bridge, and the structure thereof has a narrow $Cp$-$M_1$-$N$ angle and a wide $Q_1$-$M_1$-$Q_2$ angle to which a monomer approaches. In addition, different from a CGC structure connected by a silicon bridge, the cyclopentadiene, the phenylene bridge, nitrogen and the metal ($M_1$) are connected in order via the bonding of a ring shape to form a stable and rigid pentagonal ring structure in the transition metal compound structure of Formula 1. That is, the nitrogen atom of an amino group is connected to the phenylene bridge via two bonds in a ring shape to attain a stronger complex structure. Thus, when such transition metal compounds are reacted with a cocatalyst such as methyl aluminoxane or $B(C_6F_5)_3$, activated, and then, applied to the polymerization of olefin, an olefin polymer having high activity and high copolymerization degree may be produced even at a high polymerization temperature. Particularly, since a large amount of alpha-olefin may be introduced as well as polyethylene having a low density due to a structural characteristic of a catalyst, a polyolefin copolymer having a low density of 0.910 g/cc or less, more particularly, a density of 0.850 to 0.910 g/cc degree may be produced. In addition, a polymer having narrow MWD with respect to CGC, good copolymerization degree and high molecular weight in a low density region may be prepared by using a catalyst composition including the transition metal compound.

In addition, diverse substituents may be introduced to a cyclopentadienyl ring and a quinoline-based ring in the structure of the transition metal compound of Formula 1, and ultimately, electronic and steric environment around a metal may be easily controlled, and so, the structure and physical properties of the polyolefin thus produced may be easily controlled. The transition metal compound of Formula 1 may be preferably used for preparing a catalyst for polymerizing olefin monomers. However, the present invention is not limited thereto, and the transition metal compound may be applied in all other fields which may use thereof.

Meanwhile, the transition metal compound of Formula 2 which is mixed and used with the transition metal compound of Formula 1 has a structure in which an imide-based ligand such as phosphinimide ligands is connected to cyclopentadiene derivatives having a heterocycle including sulfur. Accordingly, if the transition metal compound of Formula 2 is used as a catalyst during the copolymerization of an olefin-based polymer of ethylene with octene, hexene, or butene, high catalyst activity is shown, and an olefin-based polymer having excellent physical properties such as a high molecular weight and a low density may be prepared. In addition, the miscibility of the transition metal compound of Formula 2 with the transition metal compound of Formula 1 is excellent, and the homogeneous mixing thereof in a catalyst composition may be attained, thereby further improving the catalyst activity of a catalyst composition.

Meanwhile, the alkyl group in the present disclosure means, if not specifically defined, linear and branched aliphatic saturated hydrocarbon groups of 1 to 20 carbon atoms. Particularly, the alkyl group includes a linear or branched alkyl group of 1 to 20 carbon atoms, more particularly, 1 to 6 carbon atoms. Particular examples of the alkyl group may include a methyl group, an ethyl group, an n-propyl group, an isopropyl group, an n-butyl group, an isobutyl group, a sec-butyl group, a t-butyl group, a pentyl group, an iso-amyl group, a hexyl group, or the like.

In addition, the alkoxy group in the present disclosure means, if not specifically defined, a linear or branched alkyl group of 1 to 20 carbon atoms, which is combined with oxygen (—OR). Particularly, the alkyl group may include an alkoxy group of 1 to 20 carbon atoms, more particularly, 1 to 6 carbon atoms. Particular examples of the alkoxy group may include a methoxy group, an ethoxy group, a propoxy group, a butoxy group, a t-butoxy group, or the like.

In addition, the alkenyl group in the present disclosure means, if not specifically defined, linear and branched aliphatic unsaturated hydrocarbon groups of 2 to 20 carbon atoms, including a carbon-carbon double bond. Particularly, the alkenyl group includes an alkenyl group of 2 to 6 carbon atoms. Particular examples of the alkenyl group may include an ethenyl group, a propenyl group, a butenyl group, or the like.

In addition, the cycloalkyl group in the present disclosure means, if not specifically defined, a cyclic saturated hydrocarbon group of 3 to 20 carbon atoms. Particularly, the cycloalkyl group includes a cycloalkyl group of 3 to 6 carbon atoms. Particular examples of the cycloalkyl group may include a cyclopropyl group, a cyclobutyl group, a cyclohexyl group, or the like.

In addition, the aryl group in the present disclosure means, if not specifically defined, a carbocycle aromatic radical of 6 to 20 carbon atoms, including at least one ring, and the rings may be attached or fused together in a pendant type. Particularly, the aryl group includes an aryl group of 6 to 20 carbon atoms, more particularly, 6 to 12 carbon atoms. Particular examples of the aryl group may include a phenyl group, a naphthyl group, an anthryl group, a phenanthryl group, a biphenyl group, or the like.

In addition, the arylalkyl group in the present disclosure means, if not specifically defined, a functional group (Ar—R—) obtained by bonding an aryl group (Ar) which is an aromatic hydrocarbon group to a carbon atom of a linear or branched alkyl group (R). Particularly, the arylalkyl group includes an arylalkyl group of 7 to 20 carbon atoms, more particularly, 7 to 12 carbon atoms. Particular examples of the arylalkyl group may include a benzyl group, a phenethyl group, or the like.

In addition, the alkylaryl group in the present disclosure means, if not specifically defined, a functional group (R—Ar—) obtained by bonding a linear or branched alkyl group (R) to a carbon atom of an aromatic hydrocarbon group (Ar). Particularly, the alkylaryl group includes an alkylaryl group of 7 to 20 carbon atoms, more particularly, 7 to 12 carbon atoms.

In addition, the aryloxy group in the present disclosure means, if not specifically defined, an aryl group combined with oxygen (—OAr), and in this case, the aryl group is the same as defined above. Particularly, the aryloxy group includes an aryloxy group of 6 to 20 carbon atoms, more particularly, 6 to 12 carbon atoms. Particular examples of the aryloxy group may include a phenoxy group, or the like.

In addition, the silyl group in the present disclosure means, if not specifically defined, an —$SiH_3$ radical derived from silane. At least one hydrogen atom in the silyl group may be substituted with various organic groups such as an alkyl group of 1 to 20 carbon atoms and a halogen group. Particularly, the silyl group may include a trimethylsilyl group, triethylsilyl, or the like.

In addition, the alkylamino group in the present disclosure means, if not specifically defined, a functional group obtained by substituting at least one hydrogen atom in an amino group (—NH$_2$) with an alkyl group, where the alkyl group is the same as defined above. Particularly, the alkylamino group may be —NR$_2$ (R may be a hydrogen atom or a linear or branched alkyl group of 1 to 20 carbon atoms, where both Rs are not hydrogen atoms).

In addition, the arylamino group in the present disclosure means, if not specifically defined, a functional group obtained by substituting at least one hydrogen atom in an amino group (—NH$_2$) with an aryl group, where the aryl group is the same as defined above.

In addition, the alkylidene group in the present disclosure means, if not specifically defined, a divalent aliphatic hydrocarbon group obtained by removing two hydrogen atoms from the same carbon atom of an alkyl group. Particularly, the alkylidene group includes an alkylidene group of 1 to 20 carbon atoms, more particularly, 1 to 12 carbon atoms. Particular examples of the alkylidene group may include a propane-2-ylidene group, or the like.

In addition, the hydrocarbyl group in the present disclosure means, if not specifically defined, a monovalent hydrocarbon group of 1 to 20 carbon atoms, which is composed of only carbon and hydrogen irrespective of the structure thereof including an alkyl group, an aryl group, an alkenyl group, an alkynyl group, a cycloalkyl group, an alkylaryl group, or an arylalkyl group. A hydrocarbylene group means a divalent hydrocarbon group of 1 to 20 carbon atoms.

In addition, the hetero hydrocarbyl group in the present disclosure may be, if not specifically defined, a hydrocarbon group including a heteroatom in place of at least one carbon atom in at least one hydrocarbon group; or a hydrocarbon group in which at least one hydrogen atom bonded to a carbon atom in at least one hydrocarbon group is substituted with a heteroatom, or a functional group including a heteroatom, where the heteroatom may be selected from the group consisting of N, O, S and Si. Particularly, the hetero hydrocarbyl group may be an alkoxy group; a phenoxy group; a carboxyl group; an acid anhydride group; an amino group; an amide group; an epoxy group; a silyl group; —[R$_a$O]$_x$R$_b$ (where R$_a$ is an alkylene group of 2 to 20 carbon atoms, R$_b$ is selected from the group consisting of a hydrogen atom, an alkyl group of 1 to 20 carbon atoms, a cycloalkyl group of 3 to 20 carbon atoms, an aryl group of 6 to 20 carbon atoms, and an arylalkyl group of 7 to 20 carbon atoms, and x is an integer of 2 to 10); a hydrocarbon group of 1 to 20 carbon atoms, including at least one functional group selected from the group consisting of a hydroxyl group, an alkoxy group, a phenoxy group, a carboxyl group, an ester group, an acid anhydride group, an amino group, an amide group, an epoxy group and a silyl group (for example, a hydroxyalkyl group, an alkoxyalkyl group, a phenoxyalkyl group, an aminoalkyl group, a thioalkyl group, or the like).

Particularly, the first transition metal compound of Formula 1 may be a compound having one structure among Formulae 1a to 1c below.

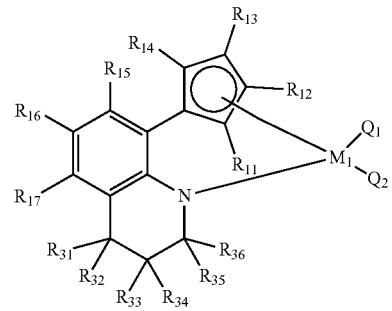

[Formula 1a]

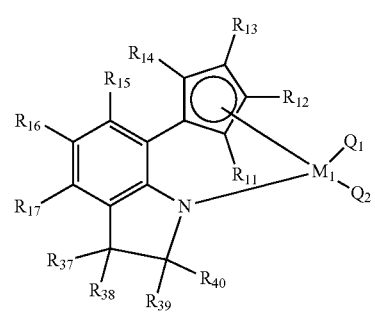

[Formula 1b]

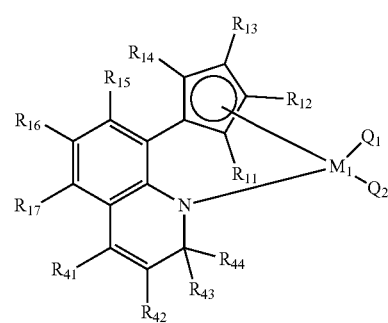

[Formula 1c]

In Formulae 1a to 1c, M$_1$ may be the same as defined above, and more particularly, may be Ti, Hf, or Zr.

In addition, Q$_1$ and Q$_2$ may be each independently the same as defined above, and more particularly, may be a halogen group or an alkyl group of 1 to 8 carbon atoms.

In addition, R$_{11}$ to R$_{14}$ may be the same as defined above, and more particularly, may be each independently selected from the group consisting of a hydrogen atom, a halogen group, a silyl group, an alkyl group of 1 to 8 carbon atoms, an alkenyl group of 2 to 8 carbon atoms, a cycloalkyl group of 3 to 12 carbon atoms, an aryl group of 6 to 18 carbon atoms, an alkylaryl group of 7 to 18 carbon atoms, an arylalkyl group of 7 to 18 carbon atoms, and a metalloid radical of a metal in group 14 substituted with a hydrocarbyl group of 1 to 8 carbon atoms; or at least two adjacent functional groups of R$_{11}$ to R$_{14}$ may be connected to each other to form an aliphatic saturated or unsaturated ring group of 5 to 18 carbon atoms or an aromatic ring group of 6 to 18 carbon atoms, which is unsubstituted or substituted with at least one substituent selected from the group consisting of a halogen group, an alkyl group of 1 to 8 carbon atoms, an alkenyl group of 2 to 8 carbon atoms, and an aryl group of 6 to 18 carbon atoms, and more particularly, may be an alkyl group of 1 to 4 carbon atoms.

In addition, R$_{15}$ to R$_{17}$ may be the same as defined above, and more particularly, may be each independently selected from the group consisting of a hydrogen atom, a halogen group, a silyl group, an alkyl group of 1 to 8 carbon atoms, an alkenyl group of 2 to 8 carbon atoms, a cycloalkyl group of 3 to 12 carbon atoms, an aryl group of 6 to 18 carbon atoms, an alkylaryl group of 7 to 18 carbon atoms, and an arylalkyl group of 7 to 18 carbon atoms, or at least two adjacent functional groups of $R_{15}$ to $R_{17}$ may be connected to each other to form an aliphatic saturated or unsaturated ring group of 5 to 18 carbon atoms or an aromatic ring of 6 to 18 carbon atoms, which is unsubstituted or substituted with at least one substituent selected from the group consisting of a halogen group, an alkyl group of 1 to 8 carbon atoms, an alkenyl group of 2 to 8 carbon atoms, and an aryl group of 6 to 18 carbon atoms.

In addition, $R_{31}$ to $R_{44}$ may be each independently selected from the group consisting of a hydrogen atom, a halogen group, an alkyl group of 1 to 8 carbon atoms, an alkenyl group of 2 to 8 carbon atoms, and an aryl group of 6 to 18 carbon atoms, or at least two adjacent functional groups may be connected to each other to form an aliphatic saturated or unsaturated ring group of 5 to 18 carbon atoms, or an aromatic ring of 6 to 18 carbon atoms, which is unsubstituted or substituted with at least one substituent selected from the group consisting of a halogen group, an alkyl group of 1 to 8 carbon atoms, an alkenyl group of 2 to 8 carbon atoms, and an aryl group of 6 to 18 carbon atoms, and more particularly, may be a hydrogen atom, a halogen atom, or an alkyl group of 1 to 4 carbon atoms, or at least two adjacent functional groups may be connected to each other to form an aromatic ring of 6 to 18 carbon atoms which is unsubstituted or substituted with an alkyl group of 1 to 8 carbon atoms.

More particularly, preferable first transition metal compound of Formula 1 to control electronic and steric environment around a metal may be Compounds (1-1) to (1-12) with the structures below, and any one thereof or a mixture of at least two thereof may be used.

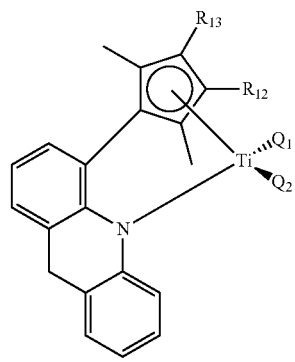
(1-1)

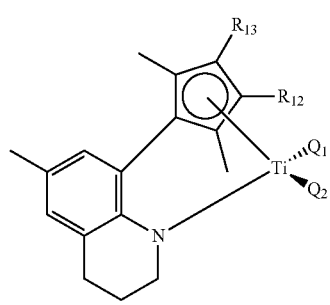
(1-2)

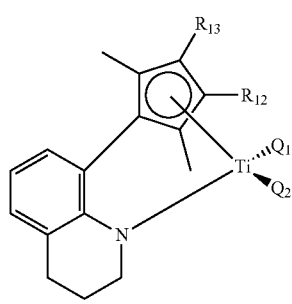
(1-3)

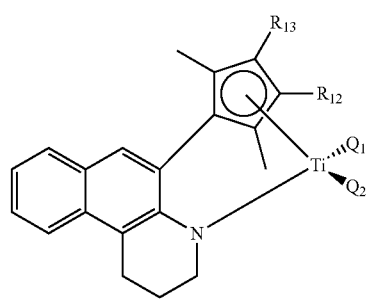
(1-4)

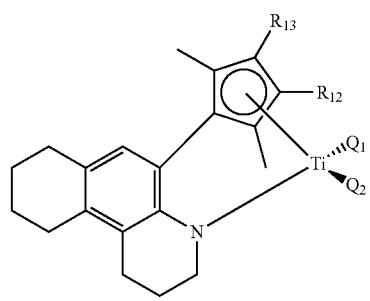
(1-5)

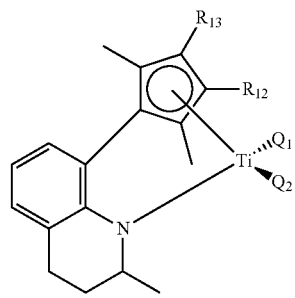
(1-6)

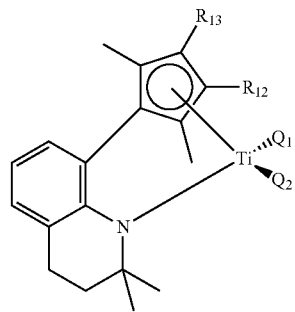
(1-7)

-continued

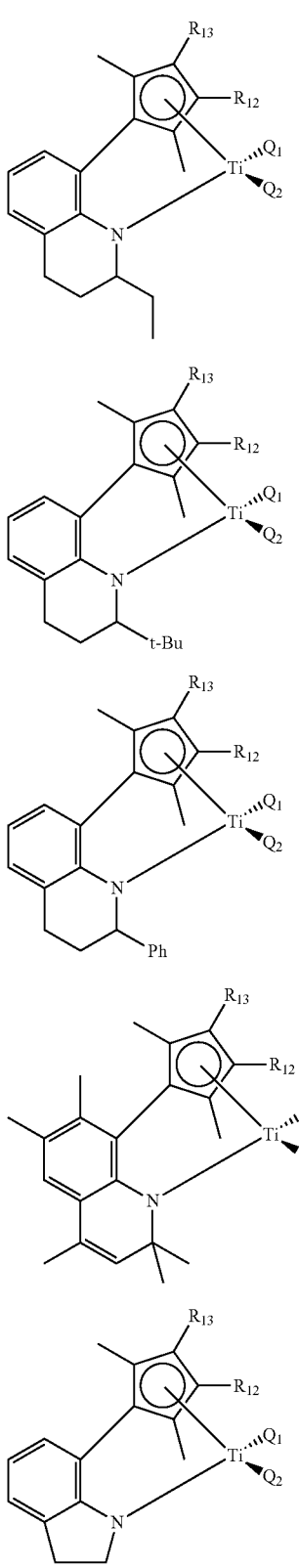

(1-8)
(1-9)
(1-10)
(1-11)
(1-12)

In the chemical structures above, $Q_1$, $Q_2$, $R_{12}$ and $R_{13}$ are the same as defined above.

In addition to the above-exemplified compounds, the first transition metal compound may have various structures within the defined range by Formula 1, and the compounds may show equivalent action and effects.

Meanwhile, the second transition metal compound of Formula 2 may be a compound of Formula 2a below.

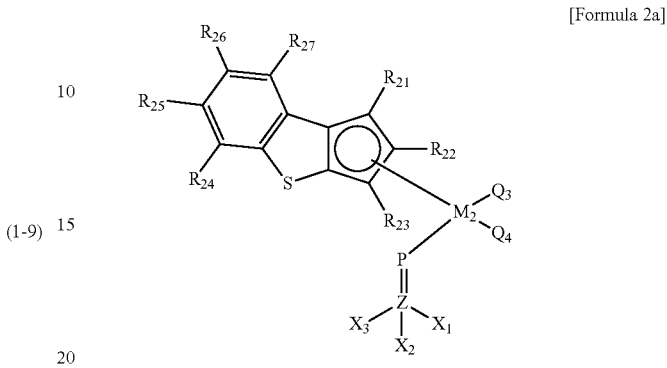

[Formula 2a]

In Formula 2a, $M_2$ may be the same as defined above, and particularly, may be Ti, Hf, or Zr, $Q_3$ and $Q_4$ may be the same as defined above, and particularly, may be each independently a halogen group or an alkyl group of 1 to 8 carbon atoms, $R_{21}$ to $R_{27}$ may be the same as defined above, and more particularly, $R_{21}$ to $R_{27}$ may be each independently selected from the group consisting of a hydrogen atom, a halogen group, a silyl group, an alkyl group of 1 to 8 carbon atoms, an alkenyl group of 2 to 6 carbon atoms, a cycloalkyl group of 3 to 12 carbon atoms, an aryl group of 6 to 18 carbon atoms, an alkylaryl group of 7 to 18 carbon atoms, an arylalkyl group of 7 to 18 carbon atoms, and a metalloid radical of a metal in group 14 substituted with a hydrocarbyl group of 1 to 8 carbon atoms, and more particularly, $R_{21}$ to $R_{27}$ may be each independently a hydrogen atom or an alkyl group of 1 to 8 carbon atoms, or 1 to 4 carbon atoms;

$X_1$ to $X_3$ may be the same as defined above, and more particularly, $X_1$ to $X_3$ may be each independently selected from the group consisting of a hydrogen atom, a halogen group, a silyl group, an amino group, an (alkyl of 1 to 8 carbon atoms)amino group, an alkyl group of 1 to 8 carbon atoms, an alkenyl group of 2 to 6 carbon atoms, a cycloalkyl group of 3 to 12 carbon atoms, an aryl group of 6 to 18 carbon atoms, an alkylaryl group of 7 to 18 carbon atoms, and an arylalkyl group of 7 to 18 carbon atoms; or at least two adjacent functional groups of $X_1$ to $X_3$ may be connected to each other to form a cycloalkyl group of 5 to 12 carbon atoms or an aryl group of 6 to 20 carbon atoms, which is substituted with at least one substituent selected from the group consisting of a halogen group, a silyl group, an amino group, an (alkyl of 1 to 8 carbon atoms)amino group, an alkyl group of 1 to 8 carbon atoms, an alkenyl group of 2 to 6 carbon atoms, and an aryl group of 6 to 12 carbon atoms. More particularly, $X_1$ to $X_3$ may be each independently selected from the group consisting of a halogen group, an alkyl group of 1 to 8 carbon atoms, a cycloalkyl group of 3 to 12 carbon atoms, and an aryl group of 6 to 12 carbon atoms.

More particularly, more preferable second transition metal compound of Formula 2 to control electronic and steric environment around a metal may be the following compounds, and any one thereof or a mixture of at least two thereof may be used.

(2-1) 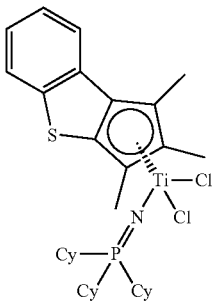

(2-2) 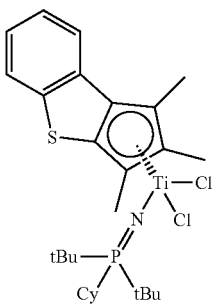

(2-3) 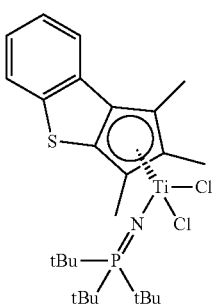

(2-4) 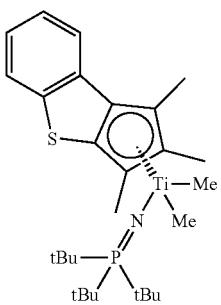

(2-5) 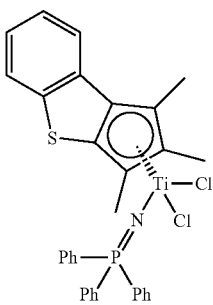

In the above chemical structures, Cy means a cyclohexyl group, tBu means a t-butyl group, Me means a methyl group, and Ph means a phenyl group.

In addition to the above-exemplified compounds, the second transition metal compound may have various structures within the defined range by Formula 2, and the compounds may show equivalent action and effects.

The first transition metal compound of Formula 1 and the second transition metal compound of Formula 2 may be prepared by using known synthetic reactions.

Meanwhile, a catalyst composition including the transition metal compounds of Formulae 1 and 2 may include the transition metal compounds of Formulae 1 and 2 in a weight ratio of 50:50 to 80:20. If the mixing ratio of the transition metal compounds of Formulae 1 and 2 deviates from the above range, the preparation of an olefin-based polymer satisfying the conditions on the physical properties defined in (1) to (4), particularly, the density conditions of (1) is difficult.

In addition, the catalyst composition may further include a cocatalyst.

The cocatalyst may be any known materials, without specific limitation, including alkylaluminoxanes, alkylaluminums or Lewis acids. Particularly, the cocatalyst may be any one selected from the group consisting of the compounds of Formulae 3 to 5 below, or a mixture of at least two thereof.

$$—[Al(R_{51})—O]a-$$ [Formula 3]

(In the above Formula 3, $R_{51}$ is each independently a halogen group, a hydrocarbyl group of 1 to 20 carbon atoms, or a hydrocarbyl group of 1 to 20 carbon atoms, substituted with halogen, and a is an integer of 2 or more)

$$D(R_{52})_3$$ [Formula 4]

(In the above Formula 4, D is aluminum or boron, and $R_{52}$ is each independently a halogen radical, a hydrocarbyl radical of 1 to 20 carbon atoms, or a hydrocarbyl radical of 1 to 20 carbon atoms, substituted with halogen)

$$[L-H]+[Z(A)_4]- \text{ or } [L]+[Z(A)_4]-$$ [Formula 5]

(In the above Formula 5, L is a neutral or cationic Lewis acid, H is a hydrogen atom, Z is an element in group 13, and A is each independently an aryl group of 6 to 20 carbon atoms or alkyl group of 1 to 20 carbon atoms, where at least one hydrogen atom may be substituted with a substituent, and the substituent is a halogen group, a hydrocarbyl group of 1 to 20 carbon atoms, an alkoxy group of 1 to 20 carbon atoms, or an aryloxy group of 6 to 20 carbon atoms)

Particularly, the compound of Formula 3 may be alkylaluminoxanes, preferably, methylaluminoxane, ethylaluminoxane, isobutylaluminoxane, butylaluminoxane, or the like, and more preferably, methylaluminoxane may be used.

In addition, the compound of Formula 4 may particularly include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminumethoxide, dimethylaluminumethoxide, trimethylboron, triethylboron, triisobutylboron, tripropylboron, tributylboron, or the like, particularly preferably, may be selected from trimethylaluminum, triethylaluminum and triisobutylaluminum.

In addition, the compound of Formula 5 may particularly include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylanilidiumtetraphenylboron, N,N-diethylanilidiumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, dimethylanilinium tetrakis(pentafluorophenyl)borate, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, triethylammoniumtetraphenylaluminum, tributylammoniumtetraphenylaluminum, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, triphenylcarboniumtetra(p-trifluoromethylphenyl)boron, triphenylcarboniumtetrapentafluorophenylboron, or the like.

In addition, the first and second transition metal compounds and the cocatalyst may be used as a supported state on a carrier. As the carrier, silica-alumina, silica-magnesia, or the like may be used, and other optional carriers known in this art may be used. In addition, the carriers may be used in a dried state at a high temperature, and the drying temperature may be, for example, from 180° C. to 800° C. If the drying temperature is less than 180° C. and excessively low, a part with an excessive amount on the carrier may react with the cocatalyst to deteriorate the performance. If the drying temperature is greater than 800° C. and excessively high, the hydroxyl content on the surface of the carrier may be decreased to reduce reaction sites with the cocatalyst.

The catalyst composition may be prepared by adding the compound of Formula 3 or Formula 4 to a first mixture of the transition metal compounds of Formulae 1 and 2 and mixing to prepare a second mixture, and adding the compound of Formula 5 thereto and mixing (first method); or by adding the compound of Formula 5 to the first mixture of the transition metal compounds of Formulae 1 and 2 and mixing (second method).

In the first method for preparing the catalyst composition, 2 to 5,000 molar ratio, more particularly, 10 to 1,000 molar ratio, further more particularly, 20 to 500 molar ratio of the compound of Formula 3 or Formula 4 may be added based on 1 mol of the first mixture of the transition metal compounds of Formulae 1 and 2. If the molar ratio of the compound of Formula 3 or Formula 4 with respect to the first mixture is less than 1:2, it is apprehended that alkylation with respect to the transition metal compounds may not be completely conducted, and if the molar ratio is greater than 1:5,000, it is apprehended that the activation of alkylated transition metal compounds may not be sufficiently accomplished due to side reactions between the excessive amount of the compound of Formula 3 or Formula 4 and the compound of Formula 5.

In addition, the compound of Formula 5 may be added in a molar ratio of 1 to 25, more particularly, 1 to 10, further more particularly, 1 to 5 based on 1 mol of the second mixture. If the molar ratio of the compound of Formula 5 with respect to the second mixture is less than 1:1, the amount of an activating agent is relatively small and the activation of the transition metal compound may not be completely conducted, thereby deteriorating the activity of a produced catalyst composition. If the molar ratio is greater than 1:25, the purity of a produced polymer may be deteriorated due to the excessive amount of the remaining compound of Formula 5.

Meanwhile, in the second method for preparing the catalyst composition, the compound of Formula 5 may be added in a molar ratio of 1 to 500, particularly, 1 to 50, more particularly, 2 to 25 based on 1 mol of the first mixture. If the molar ratio is less than 1:1, the amount of the compound of Formula 5, which is an activating agent, is relatively small, and the activation of the transition metal compounds may not be completely conducted, thereby deteriorating the activity of a produced catalyst composition. If the molar ratio is greater than 1:500, the activation of the transition metal compounds may be completely conducted, but the purity of a produced polymer may be deteriorated due to the excessive amount of the remaining compound of Formula 5.

In addition, the catalyst composition may further include an additive.

Particularly, the additive may be a compound containing at least one heteroatom selected from the group consisting of O, S, Se, N, P and Si. In addition, the compound containing a heteroatom may be a five- or six-member aromatic cyclic compound containing a heteroatom, a heterocycle compound such as heterocycloalkane and heterocycloalkene; or alkane containing a heteroatom such as alkane containing an amine group or an ether group. The compound containing a heteroatom may be substituted with one or two or more substituents selected from the group consisting of a methyl group, a phenyl group and a benzyl group. More particularly, examples of the compound containing a heteroatom may include pyridine, 3,5-dimethylpyridine, 2,4,6-trimethylpyridine, 2,6-dimethylpyridine, 2,4-dimethylpyridine, thiophene, 2-methylthiophene, 2,3-dimethylthiophene, piperidine, phosphinene, pyrrole, 2-methylpyrrole, aniline, p-toluidine, tetrahydrofuran, 2,3-dimethyltetrahydrofuran, 2,5-tetrahydrofuran, 3,4-dihydro-2H-pyrene, furan, 2-methylfuran, 2,3-dimethylfuran, 2,5-dimethylfuran, diethyl ether, methyl t-butyl ether or triethylamine, and any one thereof or a mixture of at least two thereof may be used.

Meanwhile, monomers used for preparing the olefin-based polymer may particularly include an alpha-olefin-based monomer, a cyclic olefin-based monomer, a diene olefin-based monomer, a triene olefin-based monomer, a styrene-based monomer, or the like.

The alpha-olefin-based monomer may be an aliphatic olefin of 2 to 12 carbon atoms, or 2 to 8 carbon atoms, and may particularly include ethylene, propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-itocene, 4,4-dimethyl-1-pentene, 4,4-diethyl-1-hexene, 3,4-dimethyl-1-hexene, or the like.

In addition, the cyclic olefin-based monomer may be cyclic olefin of 3 to 24 carbon atoms, or 3 to 18 carbon atoms, and may particularly include cyclopentene, cyclobutene, cyclehexene, 3-methylcyclohexene, cyclooctene, tetracyclodecene, octacyclodecene, dicyclopentadiene, norbornene, norbornadiene, phenyl norbornene, vinyl norbornene, 5-methyl-2-norbornene, 5-ethyl-2-norbornene, 5-isobutyl-2-norbornene, 5,6-dimethyl-2-norbornene, 5,5,6-trimethyl-2-norbornene, ethylidene norbornene, or the like.

In addition, the diene- and triene-based monomers may be a polyene of 4 to 26 carbon atoms, having two or three double bonds, and may particularly include 1,3-butadiene, 1,4-pentadiene, 1,4-hexadiene, 1,5-hexadiene, 1,9-decadiene, 2-methyl-1,3-butadiene, or the like.

In addition, the styrene-based monomer may be styrene; or styrene substituted with an alkyl group of 1 to 10 carbon atoms, an alkoxy group of 1 to 10 carbon atoms, a halogen group, an amino group, a silyl group, a haloalkyl group, or the like, such as alpha-methylstyrene, divinylbenzene, and 3-chloromethylstyrene.

In addition, a polymerization reaction for preparing the olefin-based polymer may be conducted via a solution phase, a slurry phase, a bulk phase or a gas phase polymerization process, because a catalyst composition is present in a supported state on a carrier, or an insoluble particulate state of a carrier as well as a homogeneous solution state. However, in the present invention, the solution polymerization process is applied. Polymerization conditions during the solution polymerization may be diversely changed according to the state of a catalyst used (homogeneous phase or nonhomogeneous phase (supported type)), a polymerization method (solution polymerization, slurry polymerization, or gas polymerization), desired polymerization results or a polymer type.

The solution polymerization may be conducted in a hydrocarbon-based solvent. The solvent may particularly be an aliphatic hydrocarbon-based solvent of 5 to 12 carbon atoms such as pentane, hexane, heptane, or the like, a hydrocarbon solvent which is substituted with a chlorine atom such as dichloromethane and chlorobenzene, an aromatic hydrocarbon solvent such as benzene and toluene. However, examples of the solvent are not limited thereto, and all solvents used in the art may be applied. The solvent used may preferably be treated with a small amount of alkylaluminums to remove a trace amount of water or air acting as a catalytic poison, and a cocatalyst may be further included. The alkylaluminums may include trialkylaluminums, dialkyl aluminum halides, alkyl aluminum dihalides, aluminum dialkyl hydrides or alkyl aluminum sesqui halides, or the like. More particularly, $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$, $(C_2H_5)_3Al_2Cl_3$, or the like may be used. These organic aluminum compounds may be continuously injected into each reactor and may be injected by a molar ratio of about 0.1 to 10 mol per 1 kg of a reaction medium which is injected into the reactor, for the appropriate removal of water.

In addition, the polymerization reaction during preparing the olefin-based polymer may be continuously conducted in a single reactor.

In addition, the polymerization reaction may be conducted in a temperature range of 120° C. to 250° C., particularly, 130° C. to 200° C. In addition, the pressure during polymerization may be from about 1 to about 150 bar, particularly, from about 1 to about 120 bar, more particularly, from about 10 to about 120 bar.

In addition, the olefin-based polymer prepared by the above-described preparation method may be surface treated with talc, or a Ca-based or Si-based inorganic material according to a common method. Accordingly, the olefin-based polymer according to the present invention may further include a coating layer including talc, or a Ca-based or Si-based inorganic material at the surface thereof.

The olefin-based polymer prepared by the preparation method and satisfying the physical property conditions may exhibit improved impact strength without degrading mechanical properties such as tensile strength. Particularly, the olefin-based polymer may have a maximum tensile strength of 160 to 200 $kgf/cm^2$ when taking measurements of maximum tensile strength according to ASTM D638 (conditions: 50 mm/min). In addition, impact strength may be 55 kgf*m/m or more at 25±5° C. when taking measurements of impact strength according to ASTM D256.

Accordingly, the olefin-based polymer may be used for hollow molding, extrusion molding or injection molding in diverse fields and uses including wrapping, construction, daily supplies, or the like, in addition to as a material of an automobile, a wire, a toy, a fiber, a medicine, or the like. Particularly, the olefin-polymer may be used for an automobile which requires excellent impact strength.

In addition, according to another embodiment of the present invention, a molded article prepared by using a polyolefin-based polymer satisfying the physical property conditions is provided.

The molded article may particularly include a blow molding molded article, an inflation molded article, a cast molded article, an extrusion laminate molded article, an extrusion molded article, a foamed molded article, an injection molded article, a sheet, a film, a fiber, a monofilament, a non-woven fabric, or the like.

MODE FOR CARRYING OUT THE INVENTION

Hereinafter, the present invention will be explained in particular with reference to the following examples. However, the following examples are illustrated to assist the understanding of the present invention, and the scope of the present invention is not limited thereto.

Synthetic Example

A compound (1.30 g, 2.37 mmol) represented by Formula (i) below was dissolved in toluene (20 ml), and MeMgBr (1.62 ml, 4.86 mmol, 2.05 eq.) was slowly added thereto dropwisely at room temperature (23° C.). After that, stirring was conducted at room temperature for 12 hours. After confirming the disappearance of starting materials via NMR, a toluene solvent was removed via vacuum filtration, and a reaction mixture was dissolved in hexane (30 ml). Then, a solid was removed by filtration, and a hexane solvent in the solution thus obtained was removed via vacuum filtration to obtain a transition metal compound of Formula (ii) below.

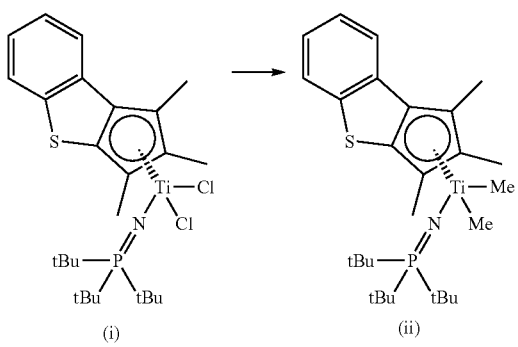

$^1$H NMR (500 MHz, in C$_6$D$_6$): 7.62 (d, 1H), 7.48 (d, 1H), 7.13 (t, 1H), 7.03 (t, 1H), 2.30 (s, 3H), 2.09 (s, 3H), 2.02 (s, 3H), 1.28 (d, 27H), −0.24 (s, 3H), −0.27 (s, 3H)

Example 1

Into a 1.5 L autoclave continuous process reactor, a hexane solvent (4.8 kg/h) and 1-octene (0.55 kg/h) were injected, and the temperature of the upper end portion of the reactor was pre-heated to 160° C. A triisobutylaluminum compound (0.05 mmol/min), [(1,2,3,4-tetrahydroquinolin-8-yl)tetramethylcyclopentadienyl-η5,κ-N]titanium dimethyl (0.5 μmol/min) as a first transition metal compound (A), a second transition metal compound of Formula ii (0.5 μmol/min, mixing weight ratio of first and second transition metal compounds=5:5), which was prepared in the synthetic example, and a dimethylanilinium tetrakis(pentafluorophenyl)borate cocatalyst (1.5 μmol/min) were injected into the reactor at the same time. Then, ethylene (0.87 kg/h) was injected into the autoclave reactor, and the pressure of 89 bar at 160° C. was maintained for 30 minutes in a continuous process, and a copolymerization reaction was conducted to produce an olefin-based random copolymer. After that, a remaining ethylene gas was exhausted out, and a polymer solution was dried in a vacuum oven for at least 12 hours. Physical properties were measured.

Example 2

An olefin-based random copolymer was prepared by conducting the same method described in Example 1 except for using 1.42 kg/h of 1-octene in Example 1.

Example 3

An olefin-based random copolymer was prepared by conducting the same method described in Example 1 except for using 1.19 kg/h of 1-octene in Example 1.

Example 4

An olefin-based random copolymer was prepared by conducting the same method described in Example 1 except for using 1.39 kg/h of 1-octene in Example 1.

Example 5

An olefin-based random copolymer was prepared by conducting the same method described in Example 1 except for using 1.50 kg/h of 1-octene in Example 1.

Example 6

An olefin-based random copolymer was prepared by conducting the same method described in Example 1 except for using 1.69 kg/h of 1-octene in Example 1.

Example 7

An olefin-based random copolymer was prepared by conducting the same method described in Example 1 except for using 1.58 kg/h of 1-octene in Example 1.

Comparative Example 1

An ethylene-1-octene copolymer (product name: EG8200) of Dow Co. was prepared.

Comparative Example 2

An ethylene-1-octene copolymer (product name: LC670) of LG Chem. Ltd., which was prepared using only one kind of a metallocene catalyst was prepared.

Comparative Example 3

An ethylene-1-octene copolymer (product name: EG8407) of Dow Co. was prepared.

Comparative Example 4

LLDPE (product name: ST508) of LG Chem. Ltd., which was prepared using only one kind of a Ziegler-Natta catalyst was prepared.

Experimental Example 1: Evaluation of Physical Properties of Olefin-Based Polymer (I)

Various physical properties of the olefin-based polymers prepared in Examples 1-7 and Comparative Examples 1-4 were measured and evaluated by the methods described below.

(1) Density of a polymer (g/cc); measured according to ASTM D-792.

(2) Melt index of a polymer (MI, g/10 min); measured according to ASTM D-1238 (condition E, 190° C., 2.16 kg load).

(3) Weight average molecular weight (Mw, g/mol) and molecular weight distribution (MWD); Each of a number average molecular weight (Mn) and a weight average molecular weight (Mw) was measured using gel permeation chromatography (GPC), and the weight average molecular weight was divided by the number average molecular weight to calculate molecular weight distribution.

(4) Temperature rising elution fractionation (TREF)

TREF was measured using a TREF machine of Polymer-Char Co. using an o-dichlorobenzene solvent in a range of −20° C.-120° C.

In detail, 40 mg of a polymer sample was dissolved in 20 ml of an o-dichlorobenzene solvent at 135° C. for 30 minutes and stabilized at 95° C. for 30 minutes. The solution thus obtained was introduced in a TREF column and cooled to −20° C. in a temperature decreasing rate of 0.5° C./min, and the temperature was kept for 2 minutes. Then, the temperature was increased by heating from −20° C. to 120° C. in a temperature increasing rate of 1° C./min, and an o-dichlorobenzene solvent was flowed in the column in a flow rate of 0.5 ml/min. The elution amount of a polymer according to the elution temperature, the elution amounts at 50° C. and 90° C., and the accumulated elution amount via purging and at 10° C. were measured.

Figure 2:
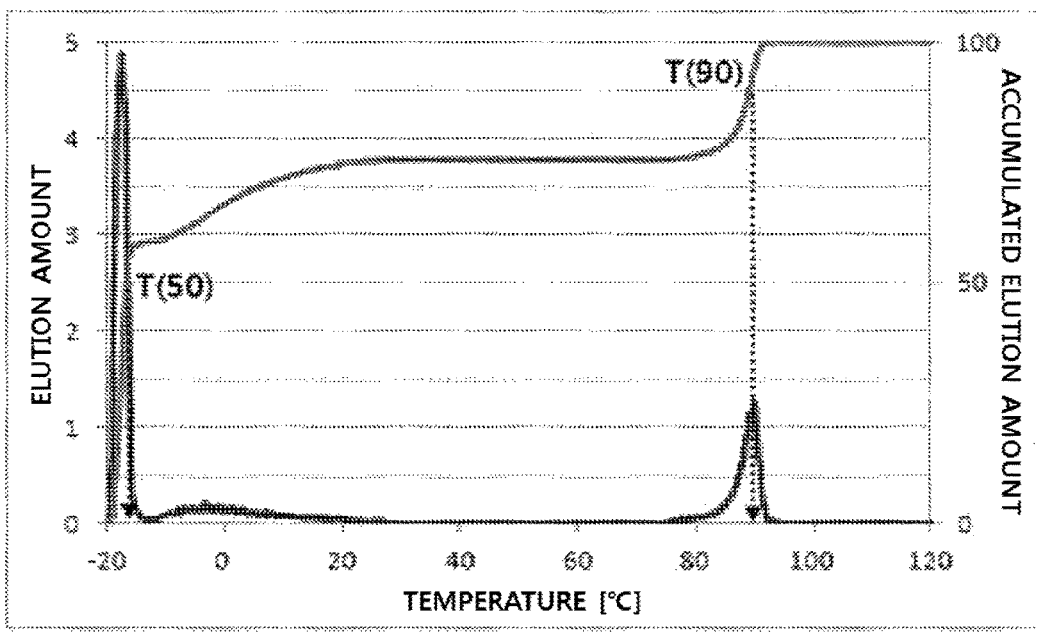
FIG. 2 illustrates a temperature rising elution fractionation (TREF) graph of an olefin-based polymer prepared in Example 2.
Figure 3:
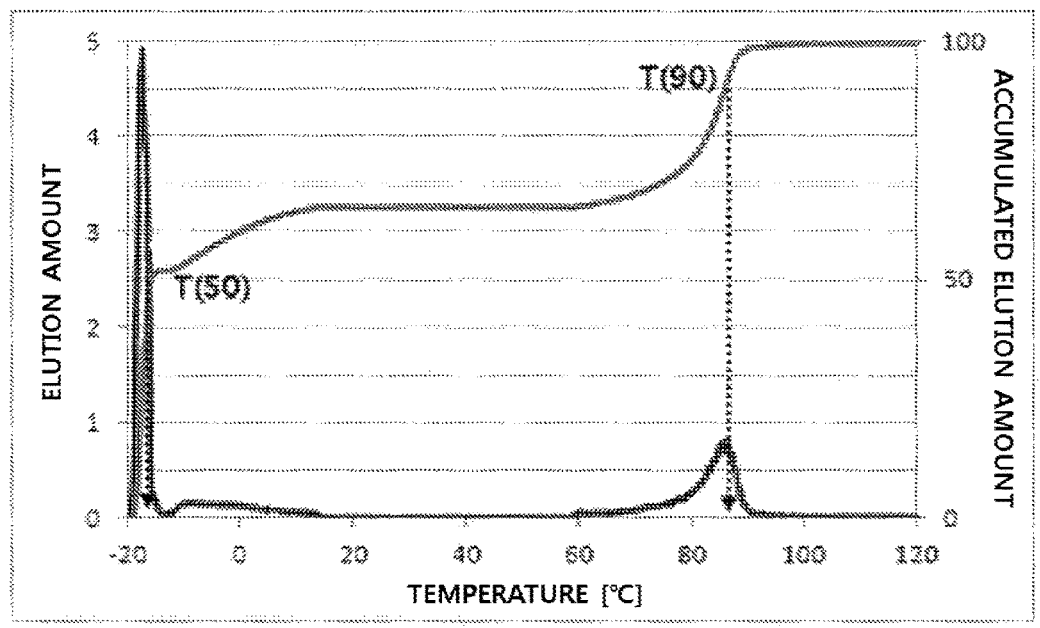
FIG. 3 illustrates a temperature rising elution fractionation (TREF) graph of an olefin-based polymer prepared in Example 3.
Figure 4:
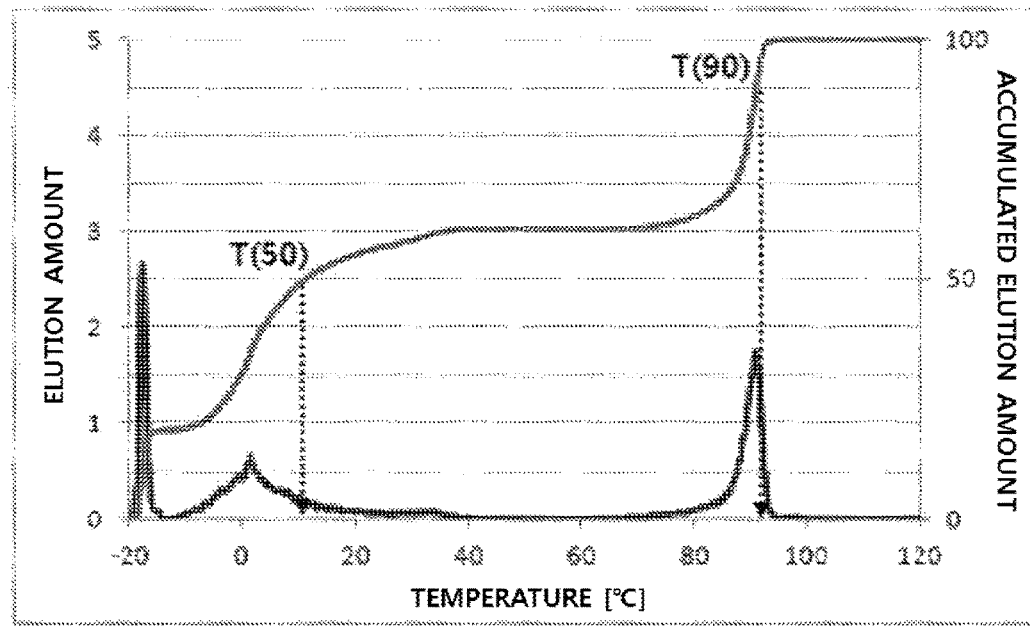
FIG. 4 illustrates a temperature rising elution fractionation (TREF) graph of an olefin-based polymer prepared in Example 4.
Figure 5:
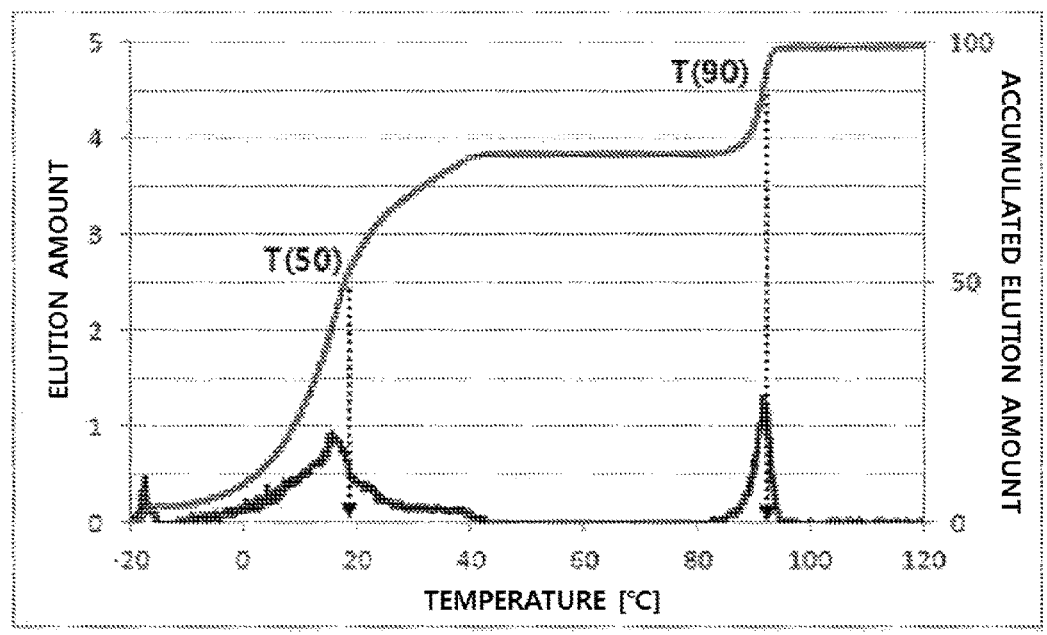
FIG. 5 illustrates a temperature rising elution fractionation (TREF) graph of an olefin-based polymer prepared in Example 5.
Figure 6:
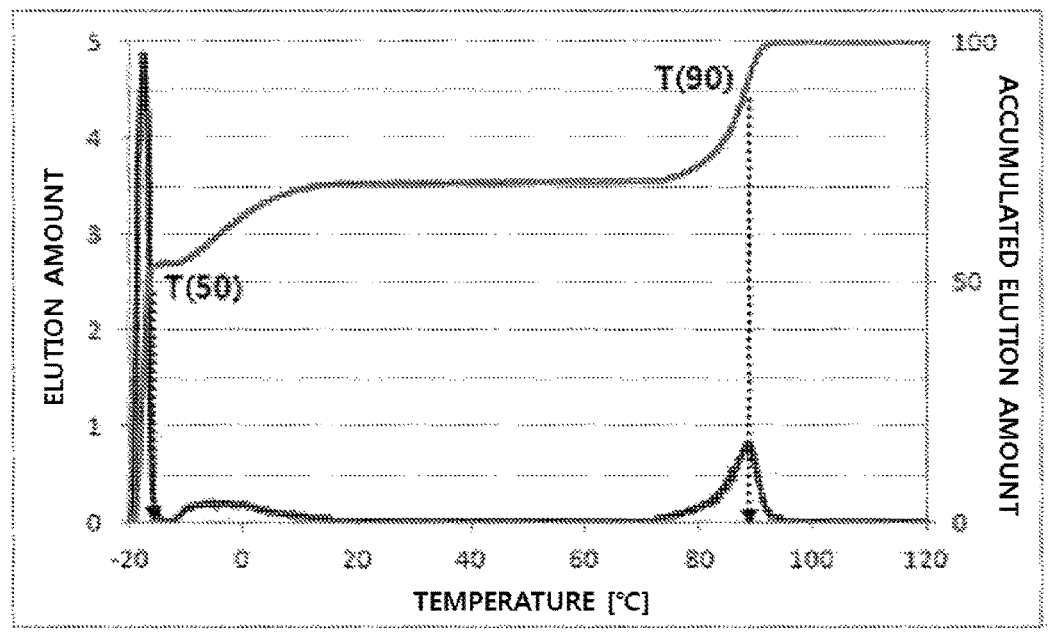
FIG. 6 illustrates a temperature rising elution fractionation (TREF) graph of an olefin-based polymer prepared in Example 6.
Figure 7:
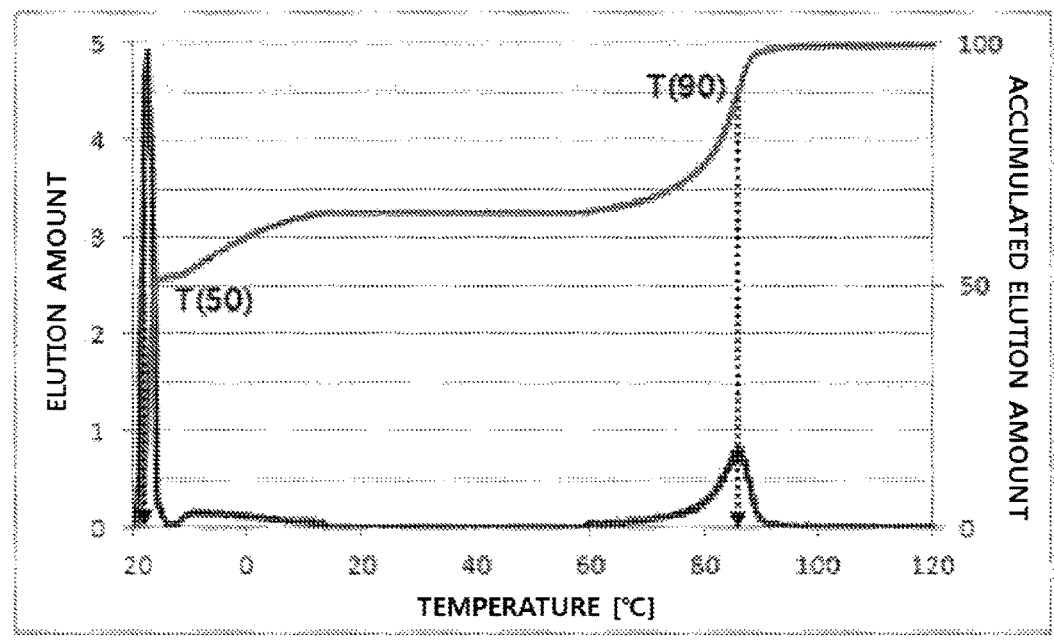
FIG. 7 illustrates a temperature rising elution fractionation (TREF) graph of an olefin-based polymer prepared in Example 7.
Figure 8:
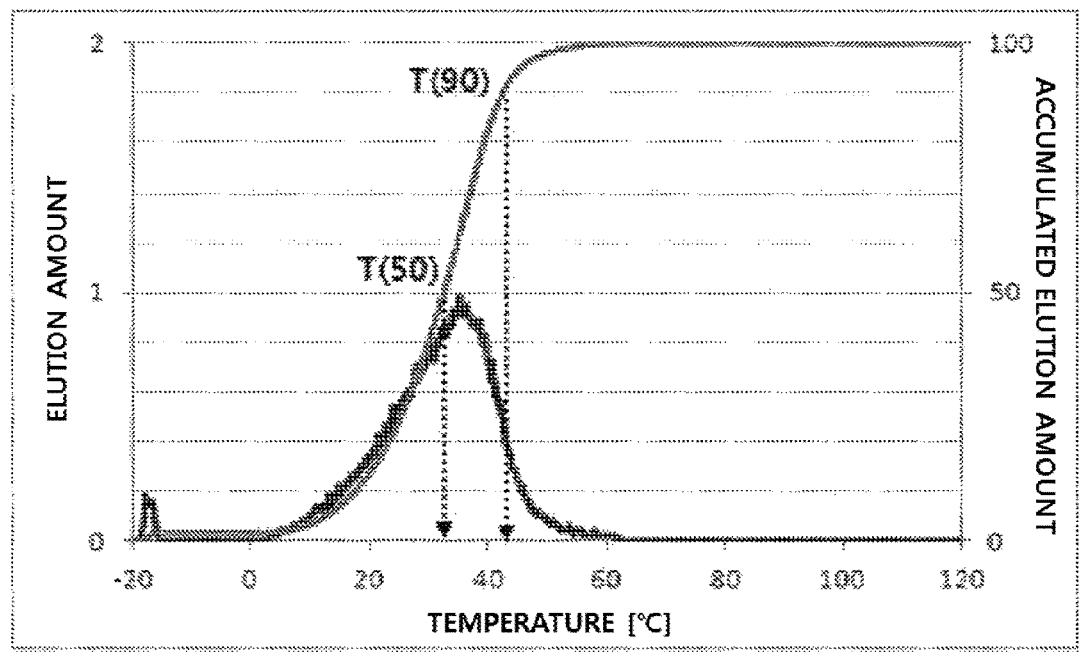
FIG. 8 illustrates a temperature rising elution fractionation (TREF) graph of an olefin-based polymer prepared in Comparative Example 1.
Figure 9:
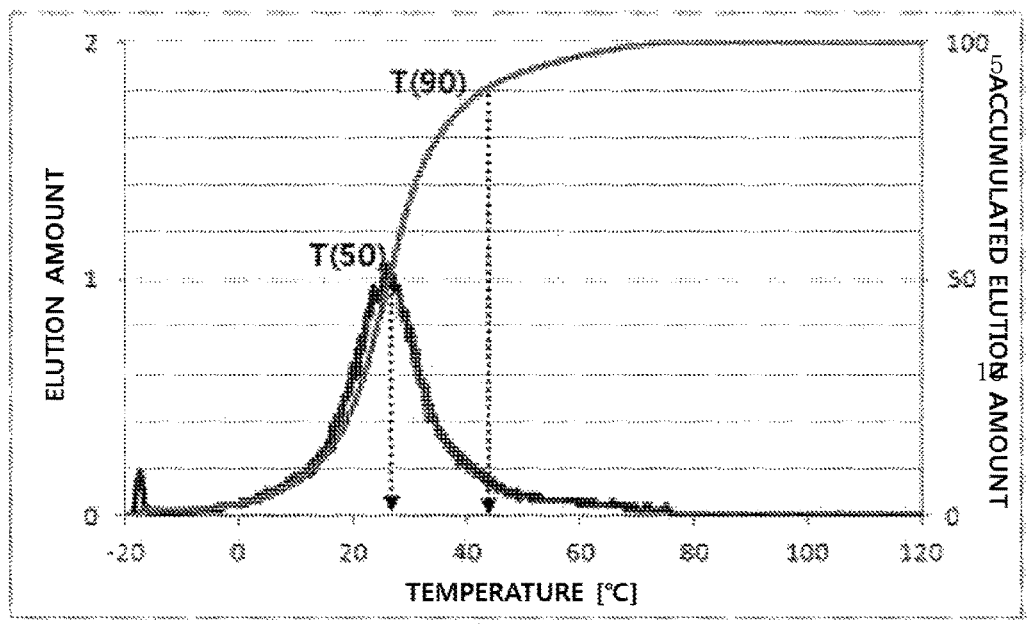
FIG. 9 illustrates a temperature rising elution fractionation (TREF) graph of an olefin-based polymer prepared in Comparative Example 2.
Figure 10:
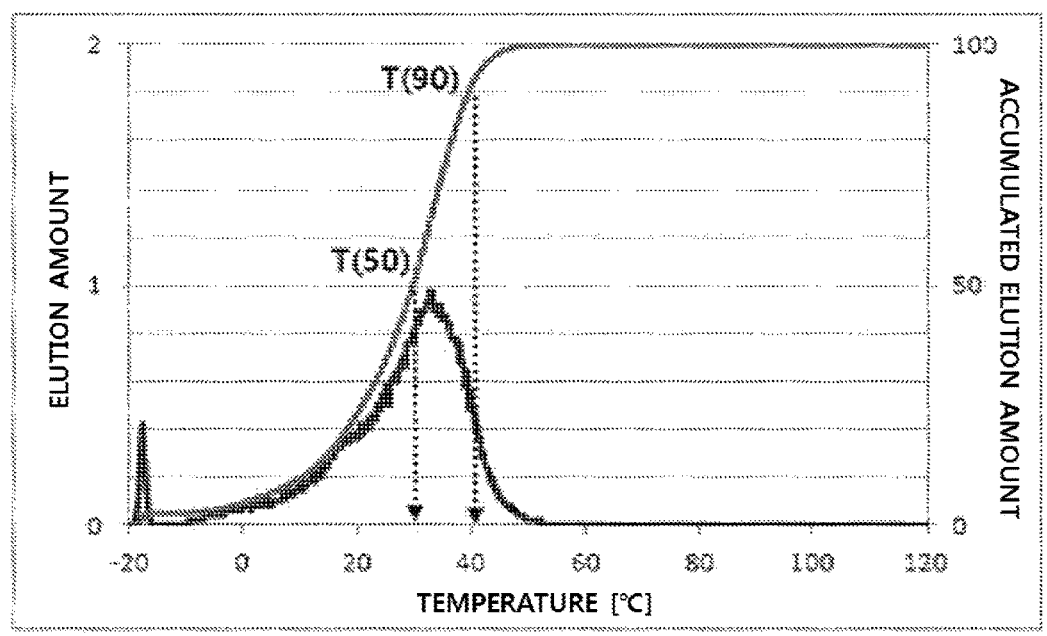
FIG. 10 illustrates a temperature rising elution fractionation (TREF) graph of an olefin-based polymer prepared in Comparative Example 3.
Figure 11:
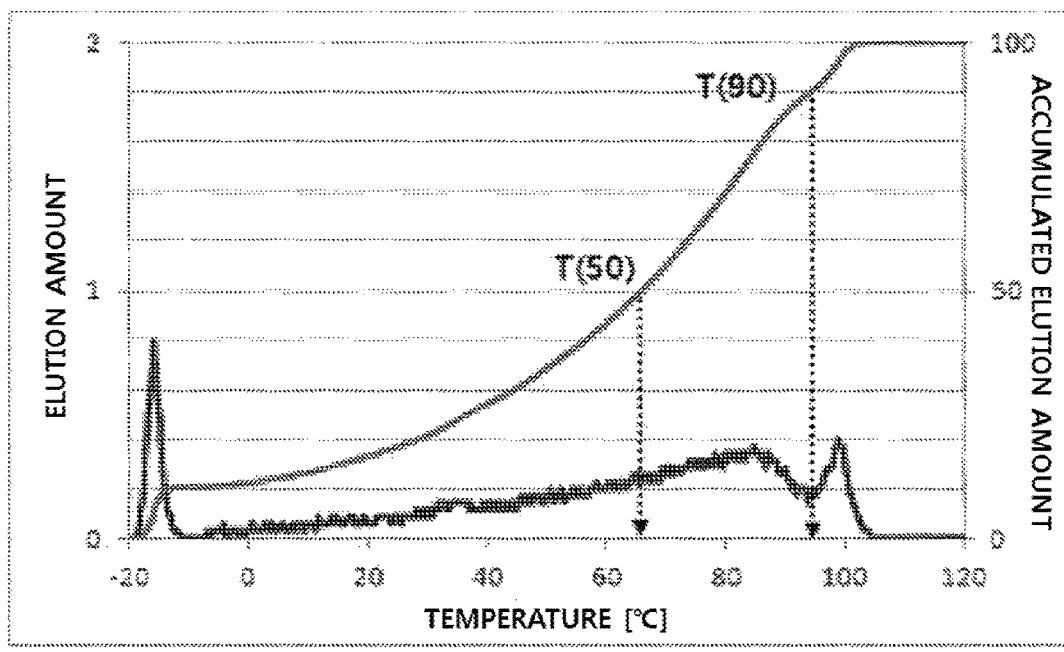
FIG. 11 illustrates a temperature rising elution fractionation (TREF) graph of an olefin-based polymer prepared in Comparative Example 4.
Figure 12:
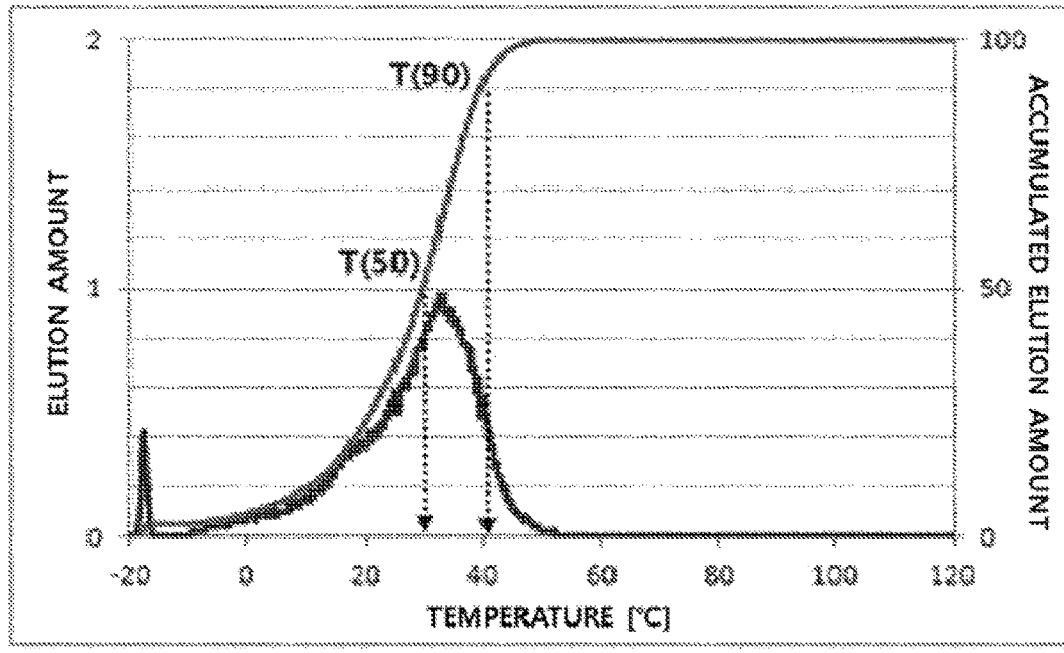
FIG. 12 illustrates a molecular weight distribution (GPC) graph of an olefin-based polymer prepared in Example 1.
Figure 13:
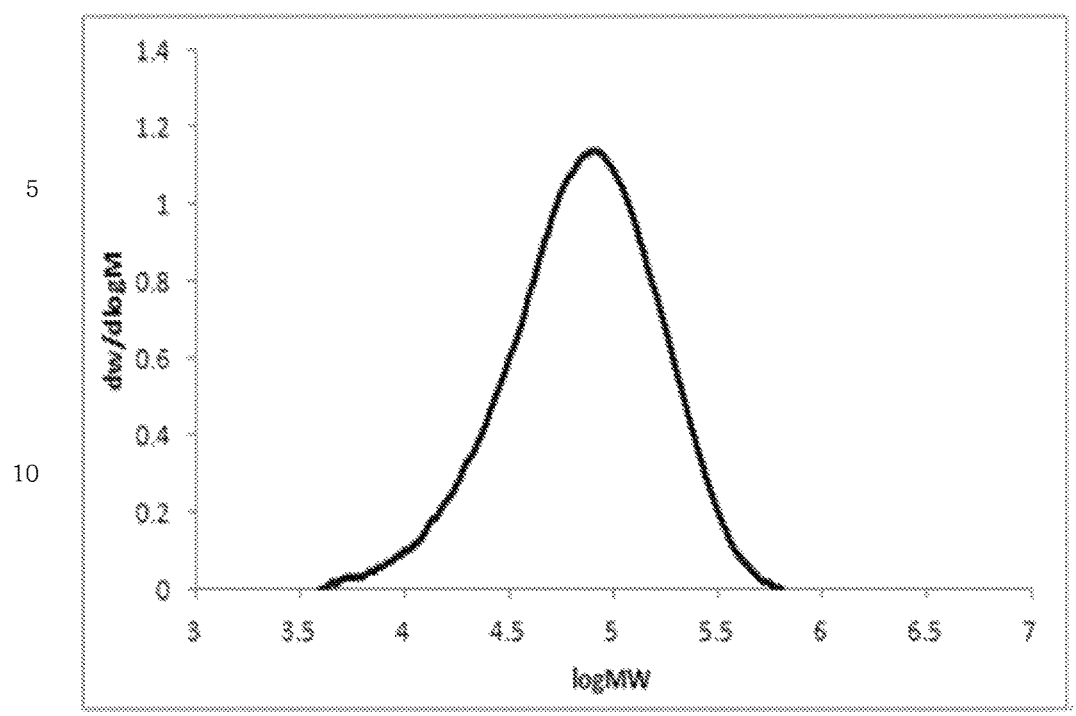
FIG. 13 illustrates a molecular weight distribution (GPC) graph of an olefin-based polymer prepared in Example 2.
Figure 14:
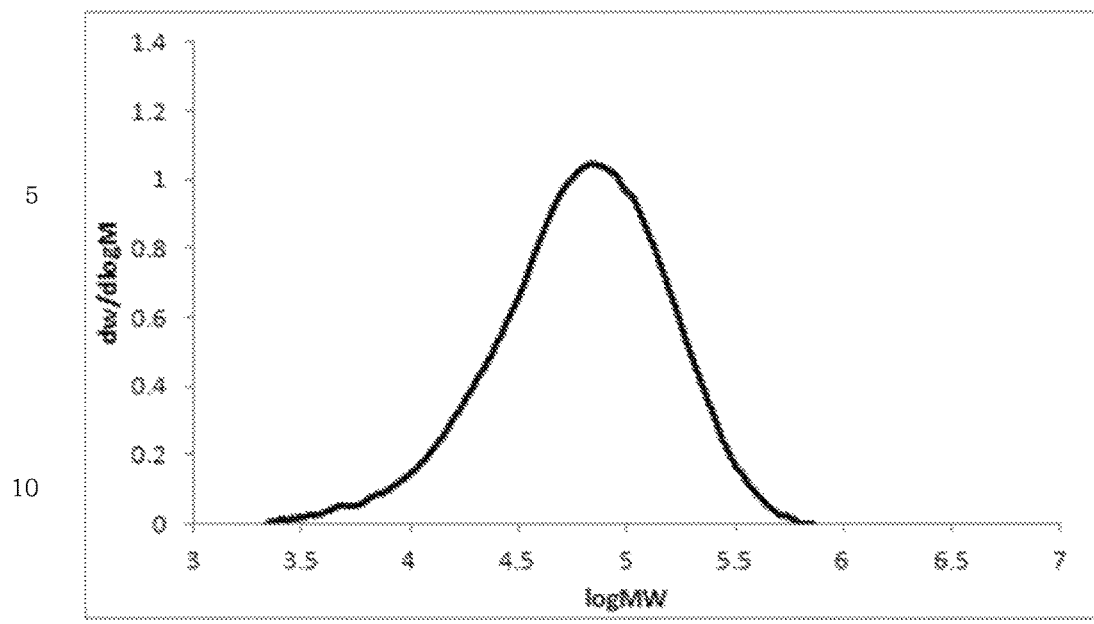
FIG. 14 illustrates a molecular weight distribution (GPC) graph of an olefin-based polymer prepared in Example 3.
Figure 15:
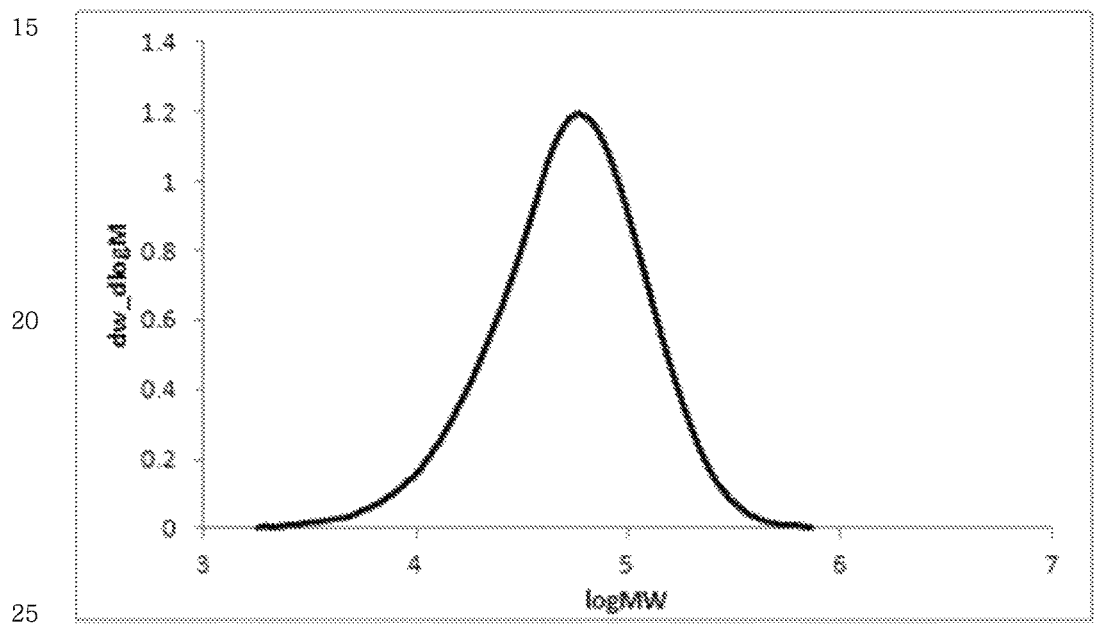
FIG. 15 illustrates a molecular weight distribution (GPC) graph of an olefin-based polymer prepared in Example 4.
Figure 16:
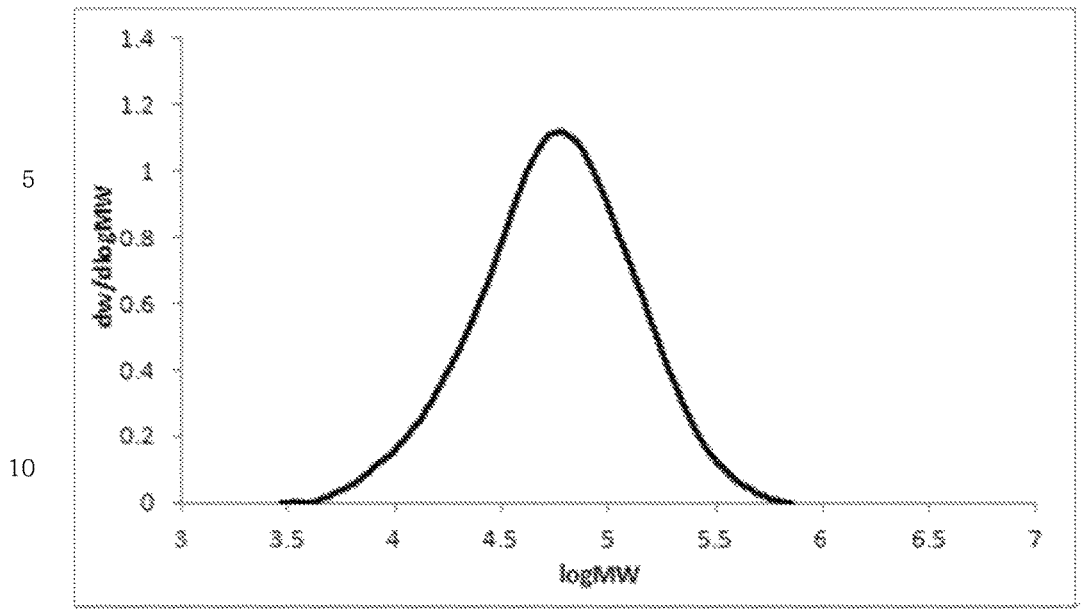
FIG. 16 illustrates a molecular weight distribution (GPC) graph of an olefin-based polymer prepared in Example 5.
Figure 17:
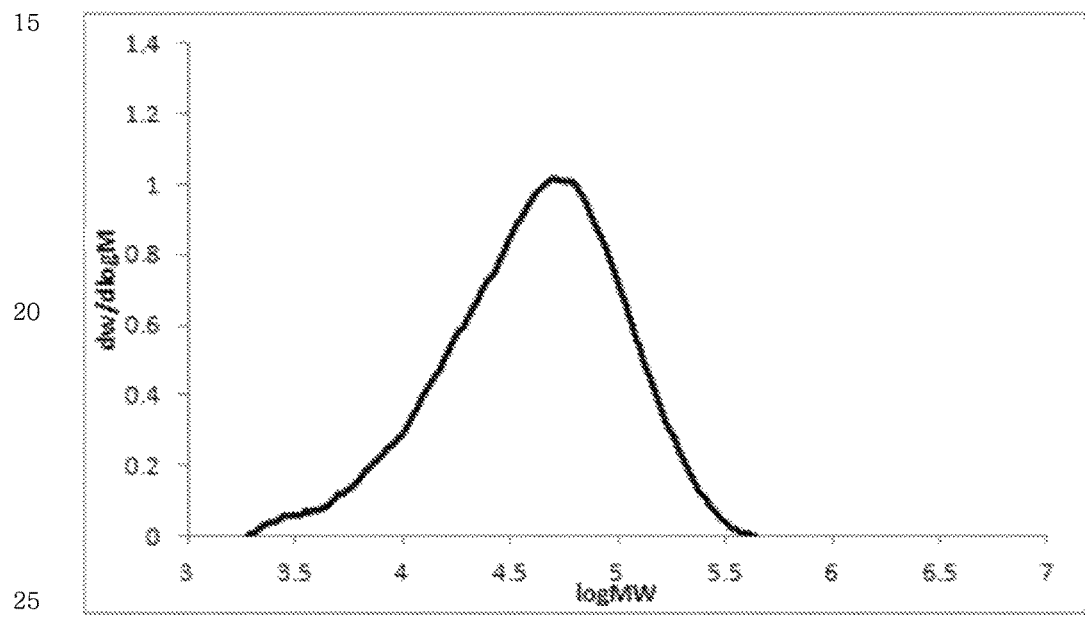
FIG. 17 illustrates a molecular weight distribution (GPC) graph of an olefin-based polymer prepared in Example 6.
Figure 18:
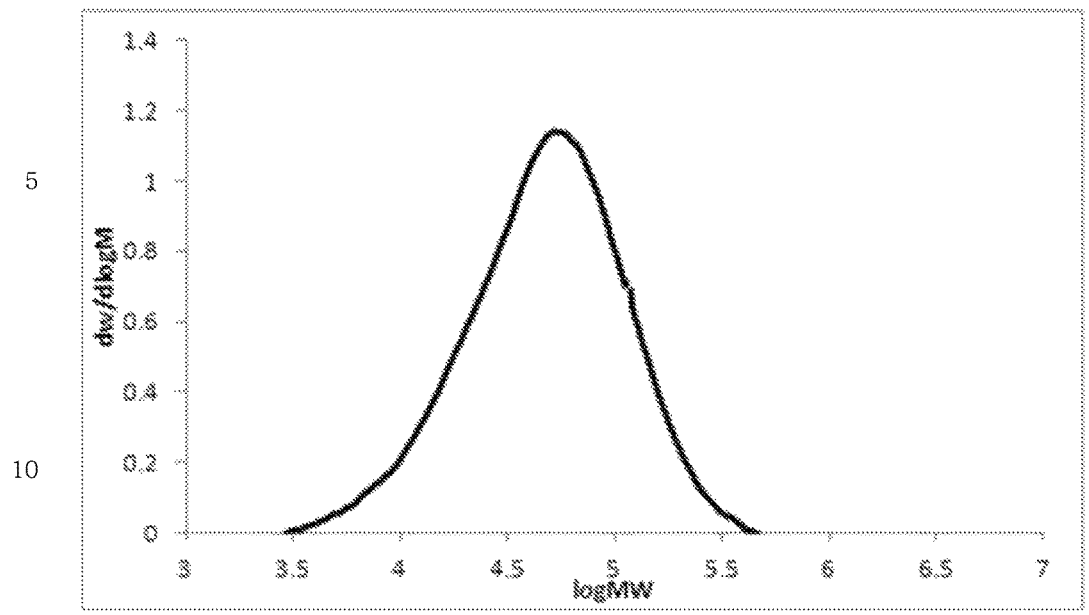
FIG. 18 illustrates a molecular weight distribution (GPC) graph of an olefin-based polymer prepared in Example 7.
Figure 19:
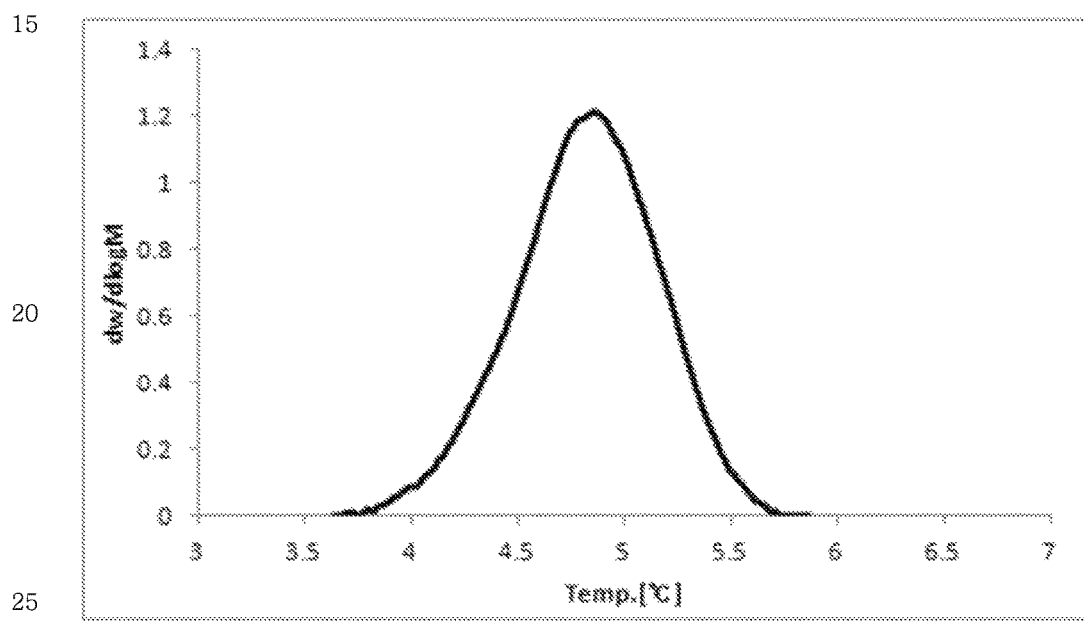
FIG. 19 illustrates a molecular weight distribution (GPC) graph of an olefin-based polymer prepared in Comparative Example 1.
Figure 20:
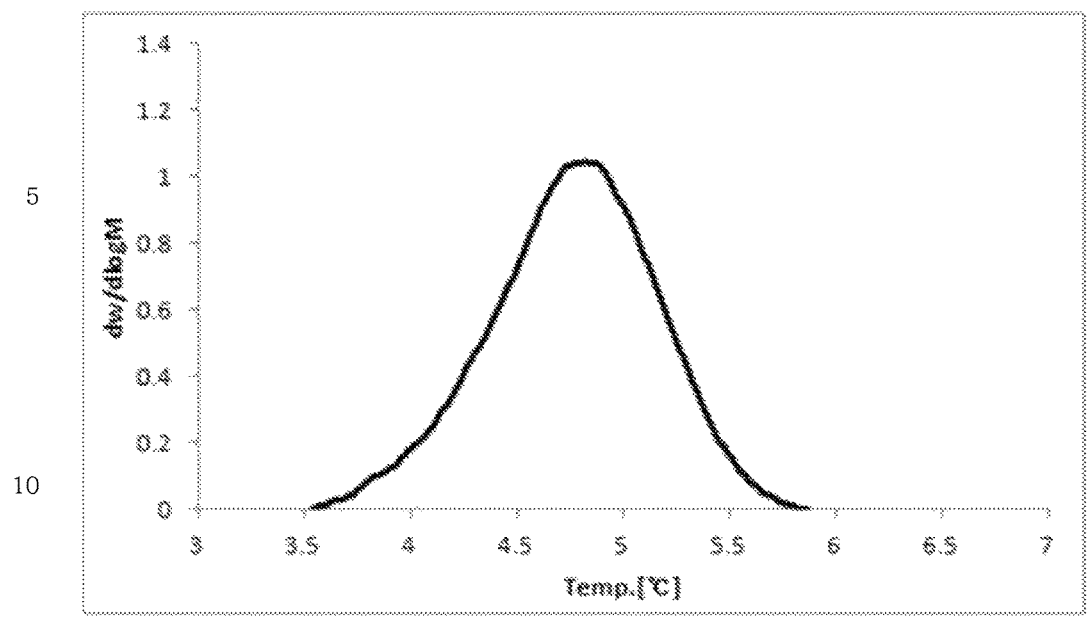
FIG. 20 illustrates a molecular weight distribution (GPC) graph of an olefin-based polymer prepared in Comparative Example 2.
Figure 21:
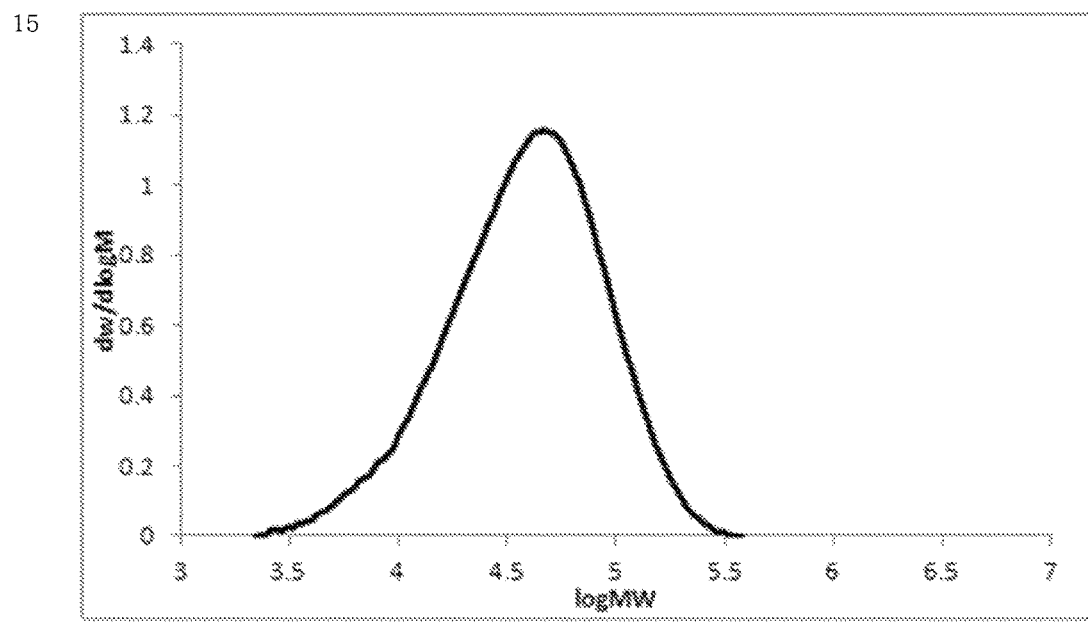
FIG. 21 illustrates a molecular weight distribution (GPC) graph of an olefin-based polymer prepared in Comparative Example 3.

The measured results are shown in FIGS. 1 to 21, and Table 1 below.

FIGS. 1 to 11 are temperature rising elution fractionation (TREF) graphs of the olefin-based polymers prepared in Examples 1-7 and Comparative Examples 1-4, and FIGS. 12 to 21 are molecular weight distribution (GPC) graphs of the olefin-based polymers prepared in Examples 1-7 and Comparative Examples 1-3.

TABLE 1

| Sample | Density g/cc | MI g/10 min | T(90) ° C. | T(50) ° C. | T(90) – T(50) ° C. | Mw Unit | MWD | Accumulated elution amount via purging and at 10°C. % | TREF peak number | GPC peak number |
|---|---|---|---|---|---|---|---|---|---|---|
| Comparative Example 1 | 0.873 | 4.9 | 42.4 | 32.6 | 9.8 | 84935 | 1.78 | 3.3 | 1 | 1 |
| Comparative Example 2 | 0.869 | 5.1 | 43.2 | 26.4 | 16.8 | 80991 | 2.17 | 7.2 | 1 | 1 |
| Comparative Example 3 | 0.871 | 27.9 | 39.4 | 29.8 | 9.6 | 50460 | 1.94 | 9.8 | 1 | 1 |
| Comparative Example 4 | 0.914 | 4.4 | 94.4 | 66.0 | 28.4 | — | — | 13.3 | 1 | 1 |
| Example 1 | 0.873 | 4.6 | 90.8 | −0.4 | 91.2 | 95200 | 1.98 | 58.9 | 2 | 1 |
| Example 2 | 0.866 | 6.6 | 89.2 | −16.8 | 106 | 94123 | 1.97 | 71.8 | 2 | 1 |
| Example 3 | 0.863 | 6.8 | 87.0 | −8.8 | 95.8 | 86434 | 2.28 | 75.2 | 2 | 1 |
| Example 4 | 0.879 | 11.18 | 91.0 | 11.2 | 79.8 | 69434 | 1.95 | 48.8 | 2 | 1 |
| Example 5 | 0.874 | 4.1 | 91.4 | 17.8 | 73.6 | 76146 | 1.99 | 22.9 | 2 | 1 |
| Example 6 | 0.872 | 31.0 | 88.0 | −16.6 | 104.6 | 58387 | 2.39 | 69.2 | 2 | 1 |
| Example 7 | 0.870 | 33.1 | 85.8 | −16.2 | 102 | 64101 | 1.99 | 64.8 | 2 | 1 |

From the experimental results, the olefin-based polymers of Examples 1 to 7 according to the present invention showed a difference between T50 and T90 of 60° C. or more, but the olefin-based polymers of Comparative Examples 1 to 4 showed a value in a range of about 10° C. to 30° C.

In addition, the olefin-based polymers of Examples 1 to 7 according to the present invention showed two peaks of a peak (P1) and a peak (P2) on TREF in a density range of 0.855 to 0.910 g/cc. In contrast, the polymers of Comparative Examples 1 to 4 showed only one peak in the same density range.

In addition, the olefin-based polymers of Examples 1 to 7 according to the present invention showed a single peak on GPC and molecular weight distribution (MWD) of 1.5 to 2.5, which is narrow molecular weight distribution of the equivalent level as that of the polymers of Comparative Examples 1 to 3.

In addition, the olefin-based polymers of Examples 1 to 7 according to the present invention showed accumulated elution amount via purging or at 10° C. in a level of 20-80%, but the accumulated elution amount of the olefin-based polymers of Comparative Examples 1 to 3 was less than 20%.

The invention claimed is:

1. An olefin-based polymer satisfying the following conditions of (1) to (4):

(1) density (d): from 0.850 to 0.910 g/cc, (2) melting index (MI, 190° C., 2.16 kg load conditions): from 0.1 to 100 g/10 min, (3) molecular weight distribution (MWD): from 1.5 to 3.0, and (4) two peaks are shown in a temperature range of −20° C. to 120° C. when taking measurements of temperature rising elution fractionation (TREF), and a relation of T(90)−T(50)≥60° C. is satisfied, wherein T(90) is a temperature at which 90 wt % of the olefin-based polymer is eluted, and T(50) is a temperature at which 50 wt % of the olefin-based polymer is eluted.

2. The olefin-based polymer of claim 1, wherein the olefin-based polymer has two peaks in a temperature range of −20° C. to 120° C. when taking measurements of temperature rising elution fractionation, and T(90)−T(50) is from 70° C. to 110° C.

3. The olefin-based polymer of claim 1, wherein the olefin-based polymer has two peaks in a temperature range of −20° C. to 120° C. when taking measurements of temperature rising elution fractionation, and a relation of T(90) ≥70° C. is satisfied, where T(90) is a temperature at which 90 wt % of the olefin-based polymer is eluted.

4. The olefin-based polymer of claim 1, wherein the olefin-based polymer has two peaks in a temperature range of −20° C. to 120° C. when taking measurements of temperature rising elution fractionation, and T(90) is from 85° C. to 120° C., where T(90) is a temperature at which 90 wt % of the olefin-based polymer is eluted.

5. The olefin-based polymer of claim 1, wherein an accumulated elution amount of the olefin-based polymer via purging of less than −20° C., or in a temperature range of −20° C. to 10° C. when taking measurements of temperature rising elution fractionation, is from 20 to 80 wt % based on a total amount of a polymer.

6. The olefin-based polymer according to claim 1, wherein the olefin-based polymer has a weight average molecular weight of 10,000 to 500,000 g/mol.

7. The olefin-based polymer according to a claim 1, wherein the olefin-based polymer has a monomodal-type peak in a molecular weight distribution curve when taking measurements of gel permeation chromatography.

8. The olefin-based polymer according to claim 1, wherein the olefin-based polymer is a homopolymer or a copolymer of olefin monomers selected from the group consisting of an alpha-olefin-based monomer, a cyclic olefin-based monomer, a diene olefin-based monomer, a triene olefin-based monomer and a styrene-based monomer.

9. The olefin-based polymer according to claim 1, wherein the olefin-based polymer is a copolymer of a monomer of ethylene or propylene; and an alpha-olefin comonomer of 3 to 12 carbon atoms.

10. The olefin-based polymer of claim 8, wherein the olefin monomer is at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidene norbornene, phenyl norbornene, vinyl norbornene, dicyclopentadiene, 1,3-butadiene, 1,4-pentadiene, 1,4-hexadiene, 1,5-hexadiene, styrene, alpha-methylstyrene, divinylbenzene, 3-chloromethylstyrene, and a mixture of at least two thereof.

11. The olefin-based polymer according to claim 1, wherein the olefin-based polymer is a copolymer of ethylene and an alpha-olefin comonomer, and an amount of the alpha-olefin comonomer is from 5 to 60 wt % based on a total amount of the olefin-based polymer.

12. The olefin-based polymer according to claim 1, wherein the olefin-based polymer is prepared by using a continuous solution polymerization reaction in the presence of a metallocene-based catalyst composition comprising at least one kind of a transition metal compound, and a block formed by linearly connecting at least two repeating units which are derived from one monomer among monomers constituting a polymer is not comprised.

13. The olefin-based polymer according to claim 1, wherein the olefin-based polymer is a random copolymer.

* * * * *